United States Patent
Chun et al.

(10) Patent No.: US 10,506,394 B2
(45) Date of Patent: Dec. 10, 2019

(54) COMMUNICATION METHOD OF TERMINAL IN V2X COMMUNICATION SYSTEM, AND TERMINAL

(71) Applicant: LG ELECTRONICS INC., Seoul (KR)

(72) Inventors: Sungduck Chun, Seoul (KR); Byounghoon Kim, Seoul (KR); Laeyoung Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/737,646

(22) PCT Filed: Feb. 11, 2016

(86) PCT No.: PCT/KR2016/001381
§ 371 (c)(1),
(2) Date: Dec. 18, 2017

(87) PCT Pub. No.: WO2017/007104
PCT Pub. Date: Jan. 12, 2017

(65) Prior Publication Data
US 2018/0184270 A1    Jun. 28, 2018

Related U.S. Application Data

(60) Provisional application No. 62/193,038, filed on Jul. 15, 2015, provisional application No. 62/192,080, (Continued)

(51) Int. Cl.
*H04W 4/40* (2018.01)
*H04W 92/10* (2009.01)
(Continued)

(52) U.S. Cl.
CPC ............... *H04W 4/40* (2018.02); *H04W 8/22* (2013.01); *H04W 24/08* (2013.01);
(Continued)

(58) Field of Classification Search
None
See application file for complete search history.

(56) References Cited

U.S. PATENT DOCUMENTS

2015/0334721 A1* 11/2015 Kim ............... H04W 72/085
370/330
2016/0105539 A1* 4/2016 Maddox ............... H04B 1/3877
455/557
(Continued)

FOREIGN PATENT DOCUMENTS

KR          10-1096375 B1      12/2011
KR     10-2014-0057723 A       5/2014
(Continued)

OTHER PUBLICATIONS

Qualcomm: "V2X Communication in 3GPP", S1-144374, 3GPP TSG-SA WG1 Meeting #68, San Francisco, USA, Nov. 17-21, 2014.

*Primary Examiner* — Michael J Moore, Jr.
*Assistant Examiner* — Gautam Sharma
(74) *Attorney, Agent, or Firm* — Dentons US LLP

(57) ABSTRACT

Disclosed are a V2X communication method and a terminal, the V2X communication method comprising the steps of: transmitting, to a network entity, a first message including capability information which indicates capability of operating as an RSU for providing a V2X service and a relay node for relaying a communication service; receiving, from a base station, a second message which instructs operation as an RSU or a relay node; and performing communication with the base station and another UE by operating as an RSU or a relay node according to the second message.

14 Claims, 22 Drawing Sheets

Related U.S. Application Data filed on Jul. 14, 2015, provisional application No. 61/190,259, filed on Jul. 9, 2015, provisional application No. 62/189,217, filed on Jul. 7, 2015.

(51) Int. Cl.
| | |
|---|---|
| *H04W 92/18* | (2009.01) |
| *H04W 24/08* | (2009.01) |
| *H04W 8/22* | (2009.01) |
| *H04W 72/04* | (2009.01) |
| *H04W 76/14* | (2018.01) |
| *H04W 88/04* | (2009.01) |
| *H04W 84/18* | (2009.01) |
| *H04L 29/08* | (2006.01) |
| *H04W 8/00* | (2009.01) |

(52) U.S. Cl.
CPC ......... *H04W 72/048* (2013.01); *H04W 76/14* (2018.02); *H04W 92/10* (2013.01); *H04W 92/18* (2013.01); *H04L 67/12* (2013.01); *H04L 67/16* (2013.01); *H04L 67/18* (2013.01); *H04W 8/005* (2013.01); *H04W 84/18* (2013.01); *H04W 88/04* (2013.01)

(56) References Cited

U.S. PATENT DOCUMENTS

| | | | |
|---|---|---|---|
| 2016/0285935 A1* | 9/2016 | Wu | H04W 4/90 |
| 2018/0035276 A1* | 2/2018 | Kang | H04W 8/005 |
| 2018/0048994 A1* | 2/2018 | Kwon | H04W 72/1294 |
| 2018/0063825 A1* | 3/2018 | Van Phan | H04W 52/0216 |
| 2018/0176850 A1* | 6/2018 | Phan | H04W 88/04 |
| 2018/0295655 A1* | 10/2018 | Cavalcanti | H04W 4/46 |

FOREIGN PATENT DOCUMENTS

| | | |
|---|---|---|
| WO | 2014/073748 A1 | 5/2014 |
| WO | 2015/026111 A1 | 2/2015 |

* cited by examiner

COMMUNICATION METHOD OF TERMINAL IN V2X COMMUNICATION SYSTEM, AND TERMINAL

This application is the National Phase of PCT International Application No. PCT/KR2016/001381, filed on Feb. 11, 2016, which claims priorities under 35 U.S.C. 119(e) to U.S. Provisional Application No. 62/193,038, filed on Jul. 15, 2015, 62/192,080, filed Jul. 14, 2015, 62/190,259, filed Jul. 9, 2015 and 62/189,217, filed Jul. 7, 2015, which are hereby incorporated by reference herein in their entirety.

TECHNICAL FIELD

Following description relates to a wireless communication system, and more particularly, to a communication method of a terminal in a V2X communication system and the terminal.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Tasks

An object of the present invention is to propose a communication mechanism between a base station of a user equipment and another user equipment in a V2X (vehicle to everything) communication system.

Another object of the present invention is to control a user equipment using a different scheme according to the necessity of a service provider.

The other object of the present invention is to efficiently design an infrastructure for providing a V2X communication service.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method of performing communication, which is performed by a UE (user equipment) with network nodes in V2X (vehicle to everything) communication environment, includes the steps of transmitting a first message including capability information of the UE capable of operating as an RSU (road side unit) for providing a V2X service and a relay node for relaying a communication service to a network entity, receiving a second message indicating the UE to operate as the RSU or the relay node from an eNB, and performing communication with the eNB and a different UE by operating as the RSU or the relay node according to the second message.

The second message can further include information on an interface to be used for a procedure of operating as the RSU or the relay node.

The information on the interface includes information on an interface to be used for performing communication with the eNB and information on an interface to be used for performing communication with the different UE and the interface may correspond to one selected from among a Uu interface, a Un interface, a PC5 interface, and a DSRC (dedicated short range communications)-related interface.

The method can further include the steps of receiving a configuration of an identifier of the UE capable of operating as the RSU or the relay node from an entity managing the V2X service, and accessing the eNB using the identifier.

If the UE accesses the eNB using the identifier, access can be preferentially permitted to the UE compared to a UE not using the identifier.

If the network entity recognizes the UE capable of operating as the RSU or the relay node, the eNB can preferentially allocate a radio resource to the UE.

The step of receiving the second message and the step of performing the communication can be performed by an application temporarily installed in the UE while the UE is charged using an external power source.

The network entity may correspond to the eNB or an MME (mobility management entity).

To further achieve these and other advantages and in accordance with the purpose of the present invention, according to a different embodiment, a UE performing communication with network nodes in V2X (vehicle to everything) communication environment includes a transmitter, a receiver, and a processor configured to operate in a manner of being connected with the transmitter and the receiver, the processor configured to control the transmitter to transmit a first message including capability information of the UE capable of operating as an RSU (road side unit) for providing a V2X service and a relay node for relaying a communication service to a network entity, the processor configured to control the receiver to receive a second message indicating the UE to operate as the RSU or the relay node from an eNB, the processor configured to perform communication with the eNB and a different UE by operating as the RSU or the relay node according to the second message.

To further achieve these and other advantages and in accordance with the purpose of the present invention, according to a further different embodiment, a method of performing communication, which is performed by a UE (user equipment) with network nodes in V2X (vehicle to everything) communication environment, includes the steps of transmitting a message including capability information of the UE capable of operating as an RSU (road side unit) for providing a V2X service and a relay node for relaying a communication service to a network entity, setting a triggering condition for initiating an operation as the RSU or the relay node, and if the triggering condition is satisfied, performing communication with the eNB and a different UE by operating as the RSU or the relay node.

An interface to be used for a procedure of operating as the RSU or the relay node can be configured together with the triggering condition.

If the number of vehicles located within a region managed by the UE is equal to or greater than a first threshold value, the triggering condition can be configured to make the UE operate as the RSU. If the number of vehicles is less than a second threshold value, the triggering condition can be configured to make the UE operate as the relay node.

To further achieve these and other advantages and in accordance with the purpose of the present invention, according to a further different embodiment, a UE performing communication with network nodes in V2X (vehicle to everything) communication environment includes a transmitter, a receiver, and a processor configured to operate in a manner of being connected with the transmitter and the receiver, the processor configured to control the transmitter to transmit a message including capability information of the UE capable of operating as an RSU (road side unit) for providing a V2X service and a relay node for relaying a communication service to a network entity, the processor configured to set a triggering condition for initiating an operation as the RSU or the relay node, the processor, if the triggering condition is satisfied, configured to perform communication with the eNB and a different UE by operating as the RSU or the relay node.

Advantageous Effects

As is apparent from the above description, the embodiments of the present invention have the following effects.

First of all, a user equipment is able to perform communication with other network entities using an efficient scheme in a V2X communication system.

Second, since a service provider is able to remotely control a user equipment in a V2X communication system, it is able to easily manage network traffic and communication throughput.

Third, it is able to save the cost for constructing and managing an infrastructure for implementing a V2X communication system.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE

Mode for Invention

Figure 1:
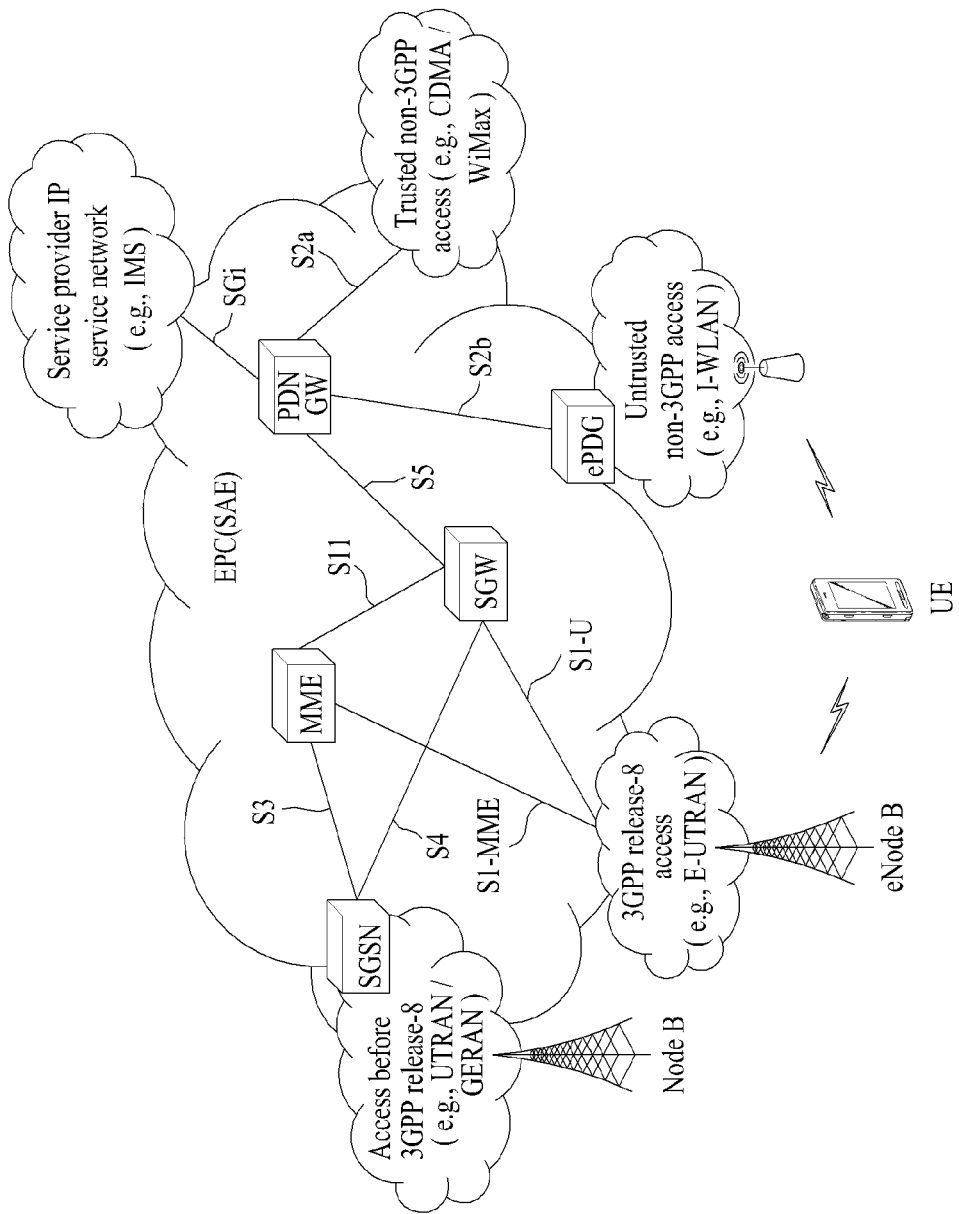
FIG. 1 is a diagram illustrating a brief structure of an evolved packet system (EPS) that includes an evolved packet core (EPC)

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

First of all, the terms used in this specification can be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP (SUPL Location Platform): entity that controls Location Service Management and Position Determination. The SLP includes SLC (SUPL Location Center) function and SPC (SUPL Positioning Center) function. Details of the SLP will be understood with reference to Open Mobile Alliance (OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

Mission Critical Push To Talk: a group communication service that provides a fast establishment time, a capability capable of processing a large scaled group, powerful security, and priority handling.

ANDSF (Access Network Discovery and Selection Function): This is one of network entities for providing a policy for discovering and selecting an access that can be used by a UE on an operator basis.

ISRP (Inter-System Routing Policy): This is a protocol defined by the operator to indicate which one will be used by the UE for routing of IP traffic among several radio access interfaces. The ISRP may include three types of protocols as follows, as a policy for defining an access network preferred (i.e., having a high priority) or restricted to route/steer a packet service (or an IP flow or IP traffic or applications). That is, the ISRP may be divided into an IP flow mobility (IFOM) protocol, a multi access PDN connectivity (MAPCON) protocol, and a non-seamless WLAN offload (NSWO) protocol as follows.

IFOM (IP Flow Mobility) protocol: This protocol is in regards to a list in which access technologies/access networks to be used by the UE are arranged according to a priority, when traffic matched to a specific IP traffic filter can be routed on a specific APN or on a random APN. Further, this protocol may designate for which radio access the traffic matched to the specific IP traffic filter is limited on the specific APN or on the random APN.

MAPCON (Multi Access PDN Connectivity) protocol: This protocol is a list in which the access technologies/access networks to be used by the UE are arranged according to the priority when a PDN connection for the specific APN can be routed. Further, this protocol may designate for which radio access a PDN connection to a specific APN will be limited.

NSWO (Non-seamless WLAN offload) protocol: This protocol designates whether certain traffic will be offloaded or not offloaded non-seamlessly to a WLAN.

ISMP (Inter-System Mobility Policy): This is a set of protocols defined by an operator to have an impact on an inter-system mobility decision made by the UE. When the UE can route IP traffic on a single radio access interface, the UE may use ISMP to select the most appropriate access technology type or access network in a given time.

RAN rule: This is a rule received from the network and is called RAN support information. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. Alternatively, when the RAN rule for moving the traffic to the 3GPP access is satisfied, the AS layer of the UE delivers a move-traffic-from-WLAN indication to the higher layer of the UE. 3GPP. 3GPP TS 23.401, TS 23.060, TS 23.402, TS 36.300, TS 36.304, TS 36.331, TS 25.304, and TS 25.331 may be incorporated herein for detailed descriptions on the RAN rule.

Local Operating Environment Information: This is a set of implementation specific parameters which describe the local environment in which the UE is operating.

Network-Based IP Flow Mobility (NBIFOM): This is IP flow mobility based on network based mobility protocol (GTP or PMIP).

UE-initiated NBIFOM: This is NBIFOM in which the UE initiates IP flow mobility.

Network-initiated NBIFOM: This is NBIFOM in which the network initiates IP flow mobility.

Multi-access PDN connection: This is a PDN connection in which traffic can be routed through the 3GPP access and/or the WLAN access. Each IP flow is routed only through one access at one instance.

Routing filter: This is a set of IP header parameter values/ranges of a packet flow used to identify IP flow for the purpose of routing.

Routing access type: This is a type of an access for routing a set of IP flows of PDN connection (3GPP access or WLAN access.

Routing Rule (RR): This is a set of information that enables association between the routing filter and the routing access type.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
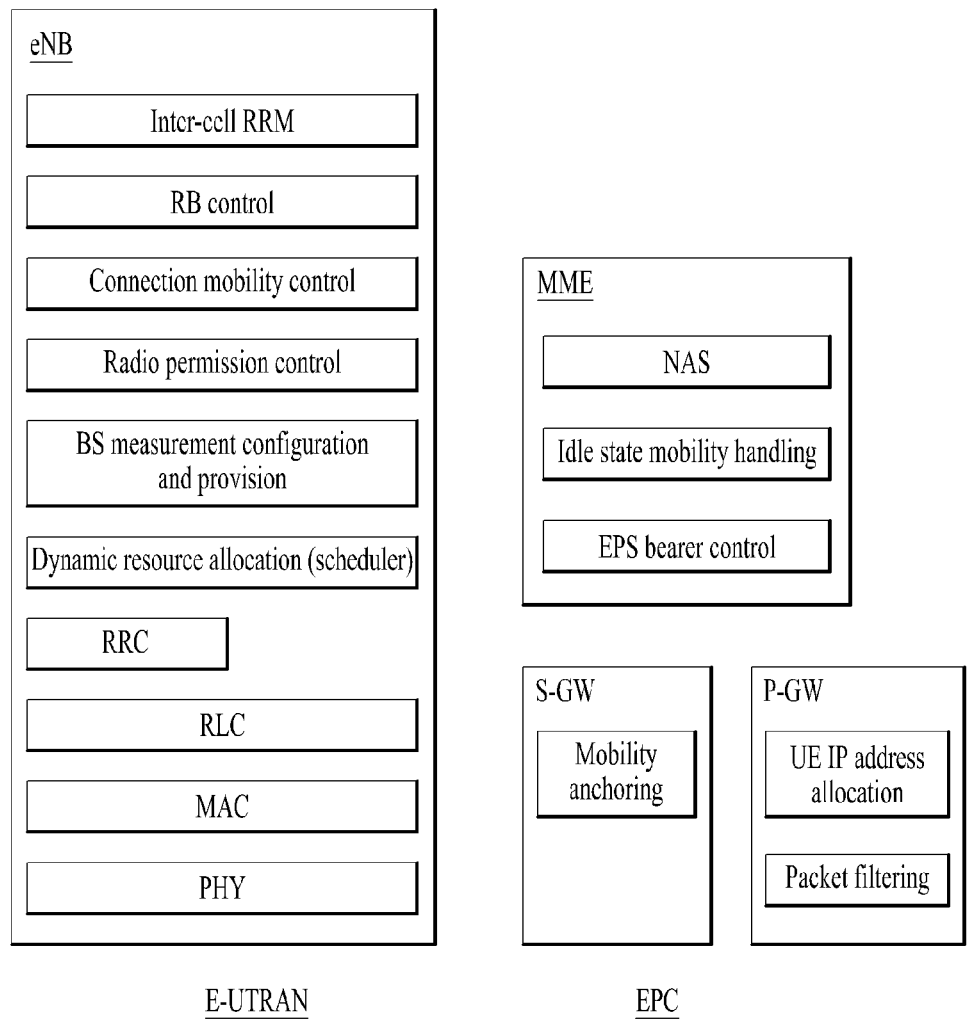
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
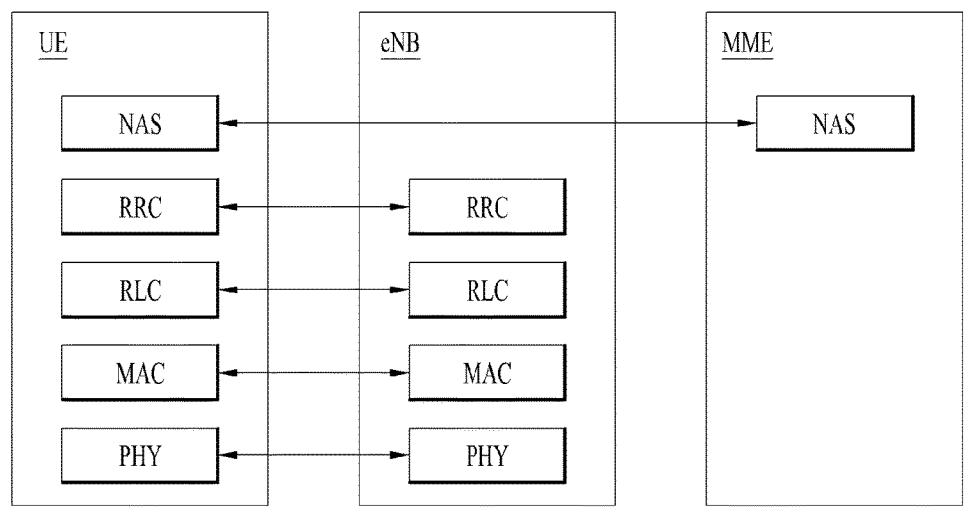
FIG. 3 is an exemplary diagram illustrating a structure of a radio interface protocol on a control plane.
Figure 4:
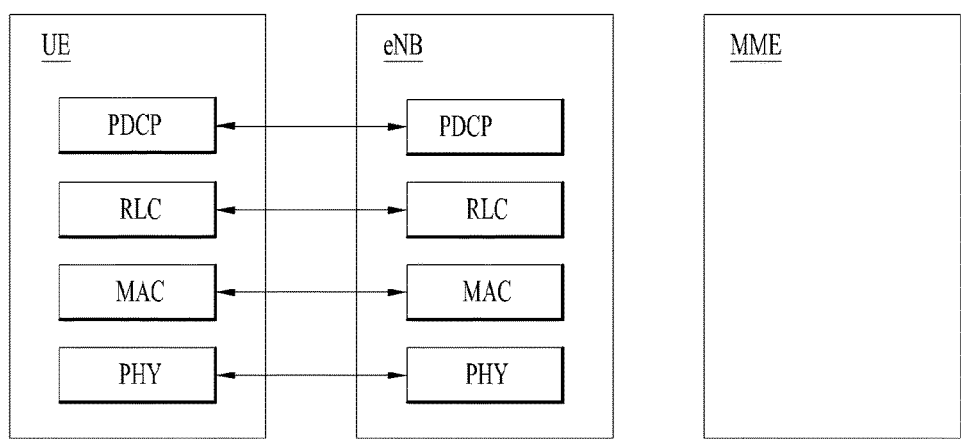
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
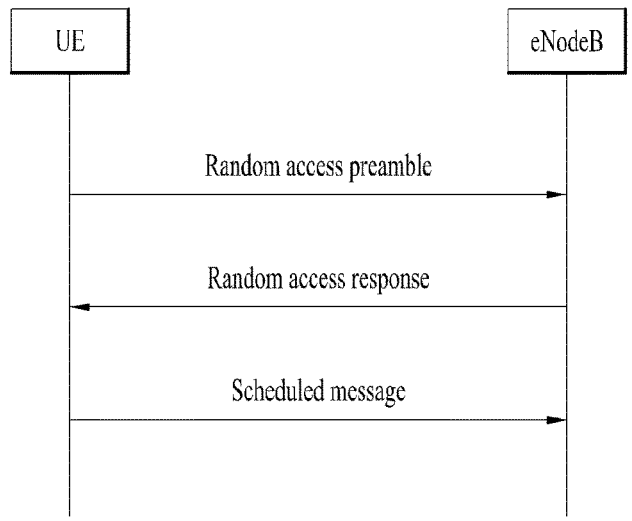
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
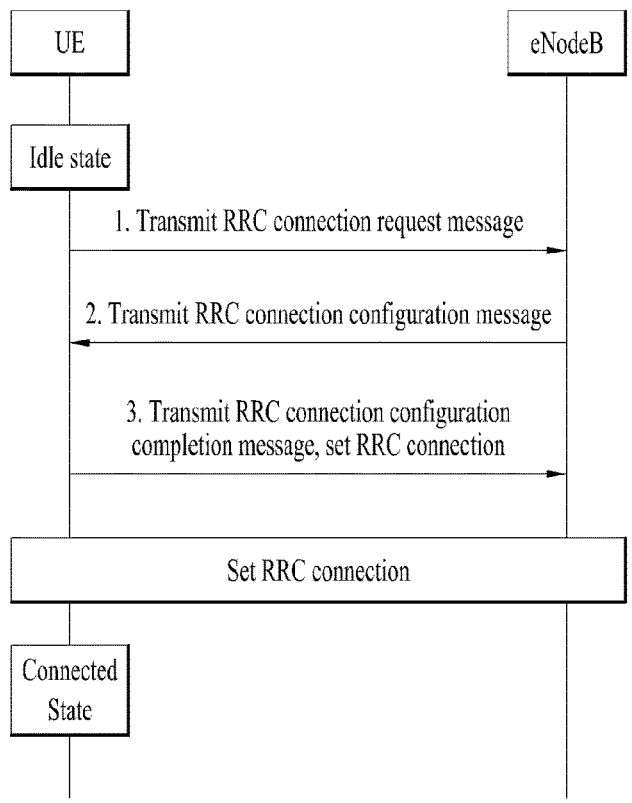
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. V2X (Vehicle to Everything) Communication

Figure 7:
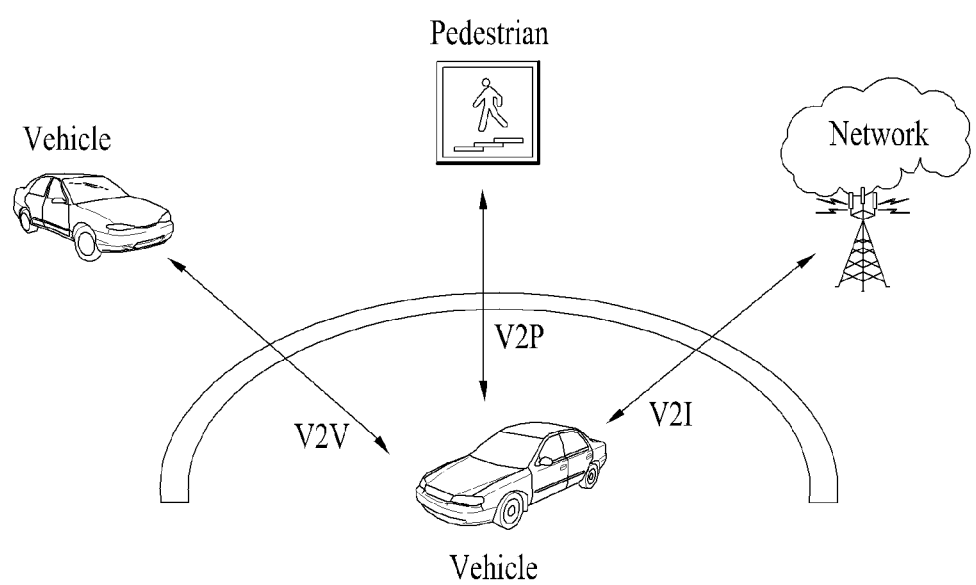
FIG. 7 is a diagram for V2X (vehicle to everything) communication environment.

FIG. 7 is a diagram showing a V2X (vehicle to everything) communication environment.

If a vehicle accident occurs, many lives are lost and serious property damage is caused. Hence, the demand for a technology capable of securing pedestrian's safety as well as vehicle boarded person's safety is increasingly rising. Hence, a vehicle-specified hardware and software based technology is grafted onto a vehicle.

An LTE based V2X (vehicle-to-everything) communication technology having started from 3GPP reflects the tendency of grafting an IT (information technology) technology onto a vehicle. Connectivity function is applied to some kinds of vehicles, and many efforts are continuously made to research and develop V2V (Vehicle-to-Vehicle) communication, V2I (Vehicle-to-Infrastructure) communication, V2P (Vehicle-to-Pedestrian) communication, and V2N (Vehicle-to-Network) communication through evolution of communication functions.

According to V2X communication, a vehicle consistently broadcasts information on its own locations, speeds, directions, etc. Having received the broadcasted information, a nearby vehicle utilizes the information for accident prevention by recognizing movements of other vehicles moving nearby.

Namely, in a similar manner that an individual person carries a user equipment in shape of a smartphone, a smartwatch or the like, a user equipment (hereinafter abbreviated UE) in specific shape is installed in each vehicle. Here, a UE installed in a vehicle means a device actually provided with a communication service from a communication network. For example, the UE installed in the vehicle can be provided with a communication service by being connected to an eNB.

Yet, various items should be considered for a process for implementing V2X communication in a vehicle. This is because astronomical costs are required for the installation of traffic safety facilities such as V2X base station and the like. Namely, in order to support V2X communication on all vehicle-movable roads, it is necessary to install hundreds or thousands of V2X base stations or more. Moreover, since each network node accesses Internet or a central control server using a wired network basically for stable communication with a server, installation and maintenance costs of the wired network are high.

In the following, a method for efficiently performing V2X communication, a scenario for implementing the method, and an infrastructure are proposed.

3. Proposed V2X Communication Method

Prior to the description of the proposed V2X communication method, several kinds of terms to be used in the following specification are defined first.

RSU (road side unit): This is an entity supportive of V2I communication and means an entity capable of performing a transmission/reception to/from a UE using a V2I application. The RSU can be implemented in an eNB or UE (particularly, a stationary UE). An eNB or UE operating as RSU collects information (e.g., traffic light information, traffic volume information, etc.) related to traffic safety and/or information on nearby vehicle movement, transmits information to another UE becoming a target of V2I communication, and receives information from another UE.

V2I communication: This is a type of V2X communication. A UE and RSU that use V2I application become main agents of the communication.

V2N communication: This is a type of V2X communication. A UE and serving entity that use V2N application become main agents of the communication and communicate with each other through an LTE network entity.

V2P communication: This is a type of V2X communication. Two UEs that use V2P application become main agents of the communication.

V2V communication: This is a type of V2X communication. Two UEs that use V2V application become main agents of the communication. V2V communication differs from V2P communication in the following. In the V2P communication, a prescribed UE becomes a UE of a pedestrian. In the V2V communication, a prescribed UE becomes a UE of a vehicle.

Uu interface (or, E-UTRAN Uu interface): This means an interface between a UE and an eNB defined in LTE/LTE-A. With respect to a relay node, this interface may mean an interface between a relay node and a UE.

Un interface: This means an interface between a relay node and an eNB. This interface means an interface used for transmission and reception performed in MBSFN (MBMS (multimedia broadcast/multicast services) over single frequency network) subframe.

PC5 interface: This means an interface used for direct communication between two UEs. This interface is used for communication between devices supportive of ProSE (proximity service).

DSRC (dedicated short range communications): This means a protocol and standard specification used for short-range or medium-range wireless communication for vehicles. Communication is performed using an interface different from the Uu, Un and PC5 interfaces.

Figure 8:
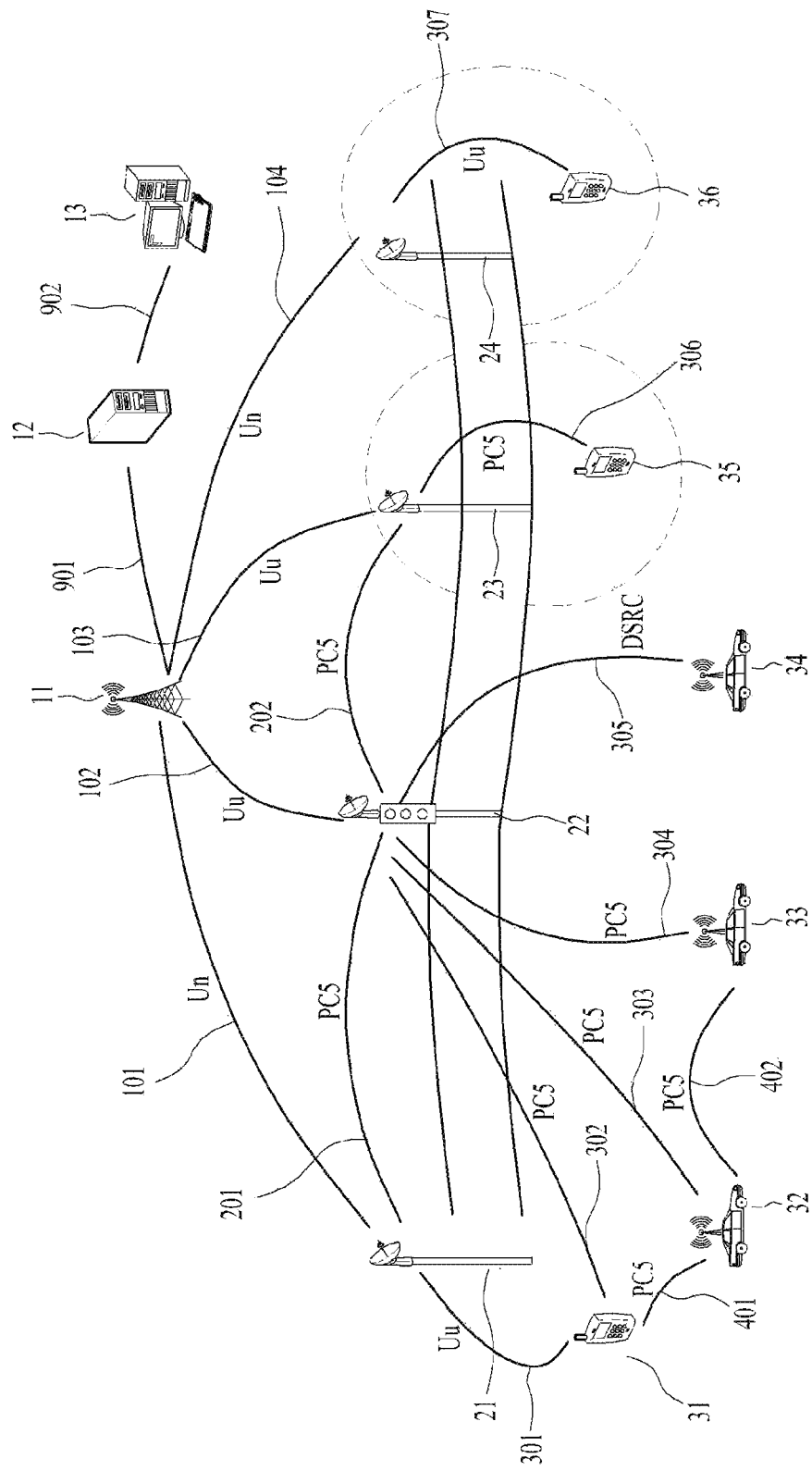
FIG. 8 is a diagram illustrating an infrastructure to which a proposed communication method is applied.

FIG. 8 is a diagram illustrating an infrastructure to which a proposed communication method is applied.

According to the proposed communication method, a service provider or an organization intending to provide a service based on V2X communication constructs an infrastructure by utilizing a UE rather than an eNB. If V2X-based infrastructure is constructed using the eNB, since it is necessary to manage a lot of UEs, configure radio resources, controls the radio resources, and configure a backbone using a wired network, it will be expensive to install the V2X-based infrastructure due to the property of the eNB.

On the contrary, if the V2X-based infrastructure is constructed using a UE, since it is able to miniaturize the UE, it is able to easily install the V2X-based infrastructure anywhere. For example, if a UE is simply attached to a traffic light to connect the UE with the traffic light, the traffic light can be utilized as a V2X infrastructure (e.g., RSU). And, since a UE basically accesses a cellular network, a user can conveniently control a V2X-based infrastructure without installing a backbone using a wired network.

Since a service provider or an organization intending to construct a V2X infrastructure using a UE remotely and wirelessly controls the UE or performs configuration, it may be able to configure the UE to operate as an RSU for V2X communication or provide a communication relay service. In other word, the UE can be configured to perform a function of an RSU. Simultaneously or optionally, the UE can also be configured to perform a relay function as a relay node.

The relay function corresponds to a function of a UE that provides communication connectivity (Internet connectivity) to a different UE adjacent to the UE. For example, when a smartphone of a pedestrian accesses the UE providing the relay function, the UE accesses such a node as an eNB or an AP according to a wireless communication service regulation such as 3G/4G/5G or WiFi. Hence, the UE supporting Internet connectivity can relay and provide Internet service to the smartphone accessing the UE while accessing a communication network using 3G/4G/5G or WiFi wireless communication service.

A service provider or an organization constructing and managing the V2X infrastructure can monitor a status of a region in which a UE providing a function of Internet connectivity is installed. Subsequently, the service provider or the organization determines whether the UE is used as an RSU or a relay node according to its own determination criteria. The determined content is forwarded to the UE using a prescribed communication protocol. The UE operates as an RSU or a relay node according to the indication. The monitoring procedure, the determining procedure, and the indicating procedure can be performed according to an indication of a user or can be automatically performed in a manner of being implemented by software.

In the procedure of determining a role of the UE among the RSU and the relay node, an interface specification to be used by the UE can be determined together. In particular, the service provider or the organization determines not only the role of the UE but also the interface specification to be used by the UE and indicates the determined interface specification to the UE. For example, if the UE is determined to operate as an RSU, the UE operates with Uu interface in a communication process with an eNB in consideration of the indicated interface specification and the UE may operate with PC5 interface in a communication process with a different UE. As a different example, if the UE is determined to operate as a relay node (e.g., a relay node according to 3GPP standard), the UE operates with Un interface in a communication process with an eNB in consideration of the indicated interface specification and the UE may operate with Uu interface in a communication process with a different UE. As a further different example, if the UE operates as a relay node (e.g., a UE-to-Network relay (layer-3 relay or application layer relay)) according to 3GPP standard), the UE can communicate with an eNB using Uu interface. When a function supported by the UE is matched with an interface, if the service provider or the organization simply informs the UE of a function to be performed by the UE among a function of an RSU and a function of a relay node, an interface is automatically determined. However, if a UE supports a plurality of interfaces, the service provider or the organization may inform the UE of a function to be performed by the UE together with one interface selected from a plurality of the interfaces.

According to the proposed communication method, the service provider or the organization efficiently constructs a V2X infrastructure using an UE and dynamically controls the UE in accordance with a change of communication environment. The service provider or the organization controls the UE by indicating an interface to be used by the UE. Hence, the service provider or the organization can utilize the UE as an infrastructure such as an RSU or a relay node. As a result, it may be able to increase not only capacity of a communication network but also supply of small cells.

In the following, each of nodes belonging to the V2X infrastructure shown in FIG. 8 is explained in detail.

Node 11: corresponds to an eNB. For example, the node 11 may correspond to an eNB of E-UTRAN.

Node 12: corresponds to a CN (core network). For example, the node 12 may correspond to a different entity that provides MME, S-GW, or V2X service (service authorization, provisioning, ID management, etc.).

Node 13: corresponds to a node for a terminal of a manager network, a device, a server, an IMS (IP multimedia system), or PCRF (policy charging resource function). The IMS and/or the PCRF can be configured to be included in the node 12. A manager can directly transmit a command to a UE via the node 13. Or, a command can be automatically transmitted to the UE by a software program written by the manager. And, the node 13 may transmit a command, which is determined based on information received from each of nodes, to the UE. A command generated by the node 13 can be forwarded to a node 21, a node 22, a node 23, and a node 24 via the node 12 and the node 11. Or, depending on an implementation scheme, the node 13 may delegate a function of determining and controlling a command to the node 11 or the node 12. For example, the node 11 (eNB) configured to manage a radio resource can configure modes of the nodes 21, 22, 23, and 24. Each of the nodes 21, 22, 23, and 24 can operate according to the configuration configured by the node 11. In this case, the mode indicates a function to be performed by each node among an RSU function (RSU mode) and a relay function (relay mode). And, the node 13 can also indicate an interface (e.g., Uu, Un, PC5, DSRC, etc.) to be used by each node for performing communication with other nodes, which have accessed the node 13. Having received information configured by the node 13, nodes operate according to the configuration. And, the node 13 receives traffic information related to V2X communication from lower nodes and receives ITS-related information from an ITS (intelligent transport system)-related server. The node 13 reprocesses the ITS-related information and can transmit the reprocessed ITS-related information to the lower nodes or the ITS server.

Node 21: corresponds to a node performing a function of an RSU. In particular, the node 21 corresponds to a node operating in an RSU mode. The node 21 receives a communication connectivity service from the node 11 via Un interface 101 and provides the communication connectivity service to other terminals (or nodes). The node 21 may provide V2X-related service to other nodes. In the depicted example, the node 21 provides a communication connectivity service to the node 22 via Uu interface 201. The node 21 can be simply installed in a structure such as an electric pole, a cradle, a traffic light, and the like. If the node 21 is installed in a traffic-related structure, the node 21 is able to transceive information with the traffic-related structure. As mentioned in the foregoing description, the node 21 can be implemented by a UE (especially, a stationary UE).

Node 22: corresponds to a different node performing a function of an RSU. The node 22 receives a connection connectivity service from the node 11 via Uu interface 102 and provides a V2X-related service to other terminals or nodes. The node 22 supports a plurality of V2X services based on communication technologies different from each other. For example, if the node 22 is implemented by a UE equipped with a communication module supporting DSRC and an LTE communication module, the node 22 can support both a V2X service supporting LTE-based PC5 interface and a DSRC/WAVE-based V2X service. Hence, the node 22 can transmit V2X service information, which is received using the DSRC, using LTE V2X service. The node 22 can perform an opposite operation as well. As shown in the drawing, the node 22 receives V2X information from a node 34 operating via DSRC 305, reprocesses the received information in an application, and transmits the reprocessed information to a node 33 via LTE-based V2X communication using PC5 interface 304. And, the node 22 receives V2X information from the node 33 operating via the LTE-based V2X communication and transmits the V2X information to the node 34 via the DSRC 305 based V2X communication. And, the node 22 can transmit traffic-related information received from V2X terminals (node 33 and node 34) managed by the node 22 or traffic-related information collected from a different device to upper nodes (node 11, node 12, and node 13). Moreover, the node 22 can forward information generated and received by/from the node 11, the node 12, and the node 13 to the node 33 and the node 34.

Node 23: corresponds to a node performing a function of a relay node. In particular, the node 23 corresponds to a node operating in a relay mode. The node 23 receives a communication connectivity service from the node 11 via Uu interface 103 and provides a communication connectivity service to a node 35 using PC5 interface 306. In particular, the node 23 corresponds to a terminal accessing a broadband communication network and plays role in providing a communication service to other terminals. Depending on a configuration, the node 23 may use Uu interface to provide a communication service to the node 35. In particular, the node 23 is connected with the node 12 and the node 13 via the node 11. If an interface to be used for performing communication with the node 11 and an interface to be used for performing communication with the node 35 are determined according to a configuration of a manager, the node 23 operates according to the determined configuration. In this case, the node 23 can determine to perform a function of an RSU, to continuously operate as a relay node, to perform both the function of the RSU and the function of the relay node, or not to perform both the function of the RSU and the function of the relay node according to the configuration.

Node 24: corresponds to a node performing a function of a relay node. In particular, the node 24 corresponds to a node operating in a relay mode. The node 24 receives a service from the node 11 via Un interface 140 and provides a service to the node 36 using Uu interface 307. In particular, the node 24 corresponds to a terminal accessing a broadband communication network and plays role in providing a communication service to other nodes.

As mentioned in the foregoing description, the nodes 21 to 24 can be implemented using a UE.

Node 31: corresponds to a terminal such as a smartphone. The node 31 receives V2X-related service from the node 21 or the node 22 that performs a function of an RSU.

Node 32: corresponds to a terminal installed in a vehicle. The node 32 transceive V2X-related information with a node 31 supporting a V2X function or a node 33 corresponding to a terminal installed in a different vehicle. When the information is transmitted and received between the nodes, it may use PC5 interface. And, the node 32 can transceive V2X-related information with the node 22 operating in an RSU mode.

Node 33: corresponds to a terminal installed in a vehicle. The node 33 transceives V2X information with the node 32 corresponding to a terminal installed in a different vehicle and transceives V2X information with the node 22 operating in an RSU mode. If the node 33 supports LTE-based V2X service only, the node 33 is unable to directly receive V2X-related data from the node 34 supporting DSRC-based V2X service. The node 33 receives V2X data from a node supporting a plurality of V2X service protocols such as the node 22. The node 33 can include a V2X-related module, a module for collecting information sensed by a sensor installed in a vehicle, and a module for collecting information received via V2X and sensing information and processing the information.

Node 34: corresponds to a terminal installed in a vehicle. The node 34 transceives information with terminals installed in a different vehicle by communicating with the terminals. The node 34 receives information from such a node supporting an RSU function as the node 22. If the node 34 supports a DSRC-based V2X service only, the node 34 is unable to directly receive V2X data from the node 33 supporting LTE-based V2X service. The node 34 receives the V2X data via the node 22.

Node 35: corresponds to a terminal such as a smartphone. The node 35 receives a communication connectivity service from the node 23.

Node 36: corresponds to a terminal such as a smartphone. The node 36 receives a communication connectivity service from the node 24.

In the aforementioned infrastructure, the node 21, the node 22, the node 23, and the node 24 can be located at a place where communication environment is good. In particular, the nodes can be located at a higher ground capable of examining all directions. In particular, since the nodes 21, 22, 23, and 24 operate as an RSU to transmit traffic information to neighboring nodes or operate as a relay node to provide a communication connectivity service, it is necessary for the nodes 21, 22, 23, and 24 to preferentially access the node 11. Hence, in the infrastructure shown in FIG. 8, in order to preferentially allocate a radio resource to terminals operating as an RSU or a relay node, it is necessary for a terminal operating an RSU or a relay node to ask the node 11 to preferentially allocate a radio resource to the terminal.

For example, if a terminal accessing E-UTRAN operates as an RSU or a relay node, the terminal informs the node 11 that the terminal operates as an RSU or a relay node or is able to operate as an RSU or a relay node (capability) in an RRC connection request procedure. Or, the terminal operating as an RSU or a relay node can transmit information on capability indicating that the terminal operates as an RSU or a relay node or is able to operate as an RSU or a relay node in a service request procedure of NAS layer, an attach procedure, or a TAU (tracking area update) procedure.

A network can preferentially allocate a radio resource to a terminal operating as an RSU or a relay node upon the request of the terminal. Additionally, in case of a UE operating as an RSU or a relay node, information on whether the UE performs one of two functions or two functions can be stored in subscriber information. In this case, the network can determine whether to preferentially allocate a radio resource to a terminal in consideration of both information received from the terminal and the subscriber information. Or, the network can determine whether to preferentially allocate a radio resource to a terminal in consideration of previously stored subscriber information. If the network indicates the terminal to operate as an RSU or a relay node, the node 13 forwards determined information to the node 12 or the node 11. Then, the node 11 can preferentially allocate a radio resource to the node 21.

In the aforementioned procedure, the nodes 21, 22, 23, and 24 should normally operate without a failure. If a problem occurs on the nodes, it is necessary to quickly recognize an abnormal operation of the nodes to perform fast recovery. To this end, it is necessary for the terminal operating as an RSU or a relay node to periodically transceive information with at least one selected from the group consisting of the node 11, the node 12, and the node 13. In particular, it may be able to configure the nodes 21 to 24 to inform the node 11, the node 12, and/or the node 13 of information on whether or not the nodes 21 to 24 normally operate with a prescribed time interval. By doing so, the nodes 21 to 24 can periodically inform the nodes 11 to 13 of status of the nodes 21 to 24. This procedure can be implemented via a periodic TAU procedure.

According to one embodiment, an ITS service provider can install an RSU implemented by a UE to provide an ITS service. It may transmit information or provide an ITS service to vehicles or terminals related to traffic using Uu interface or PC5 interface based on a UE. Yet, if it is necessary to increase the number of cells due to the increase of load of a cellular communication network, the ITS service provider can switch a partial configuration of UE-based RSUs into a relay node using a constructed ITS network consisting of the UE-based RSUs. By doing so, the number of cells increases and capacity of a mobile data service is easily increased. On the contrary, when a service provider providing a mobile data service constructs a network by installing a UE-based relay node in advance and a V2X service (i.e., ITS service) is activated, if a configuration of the previously installed relay node is switched to an ITS infrastructure, the relay node can be utilized as an RSU for transmitting V2X information.

To this end, a service provider constructing a communication network or a V2X network using a UE can preferentially configure the UE to support a plurality of communication specifications and a plurality of interfaces and then install the UE. For example, the service provider can configure the UE to perform an operation according to various interfaces and function such as the Uu interface, the Un interface, the PC5 interface, the DSRC function, a function according to IEEE 802.11p, and the like before the UE is installed. In particular, if configuration information is remotely transmitted to the UE, the UE can inform the service provider of a function and an interface with which the UE operates.

Figure 9:
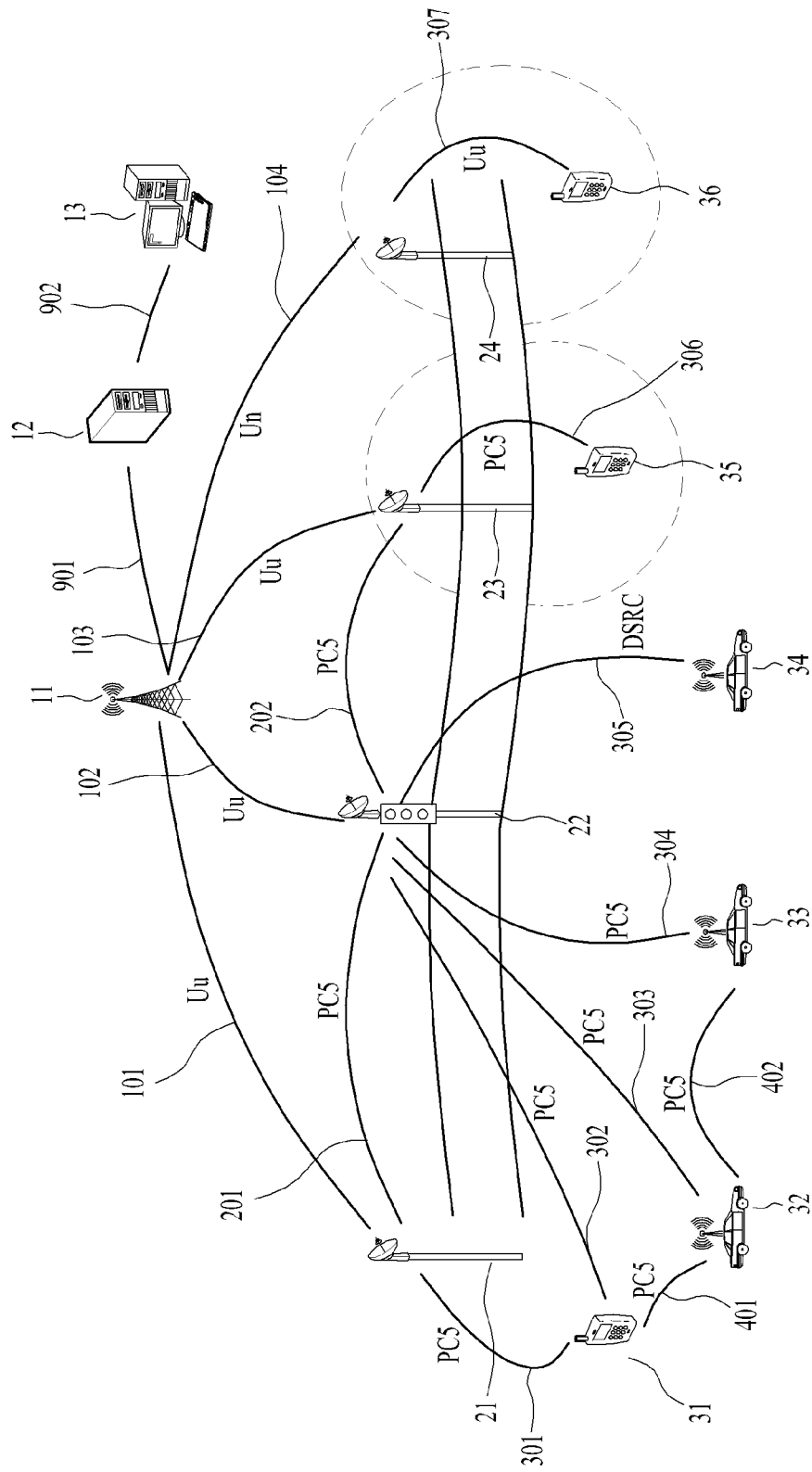
FIG. 9 is a diagram illustrating a different infrastructure to which a proposed communication method is applied.
Figure 10:
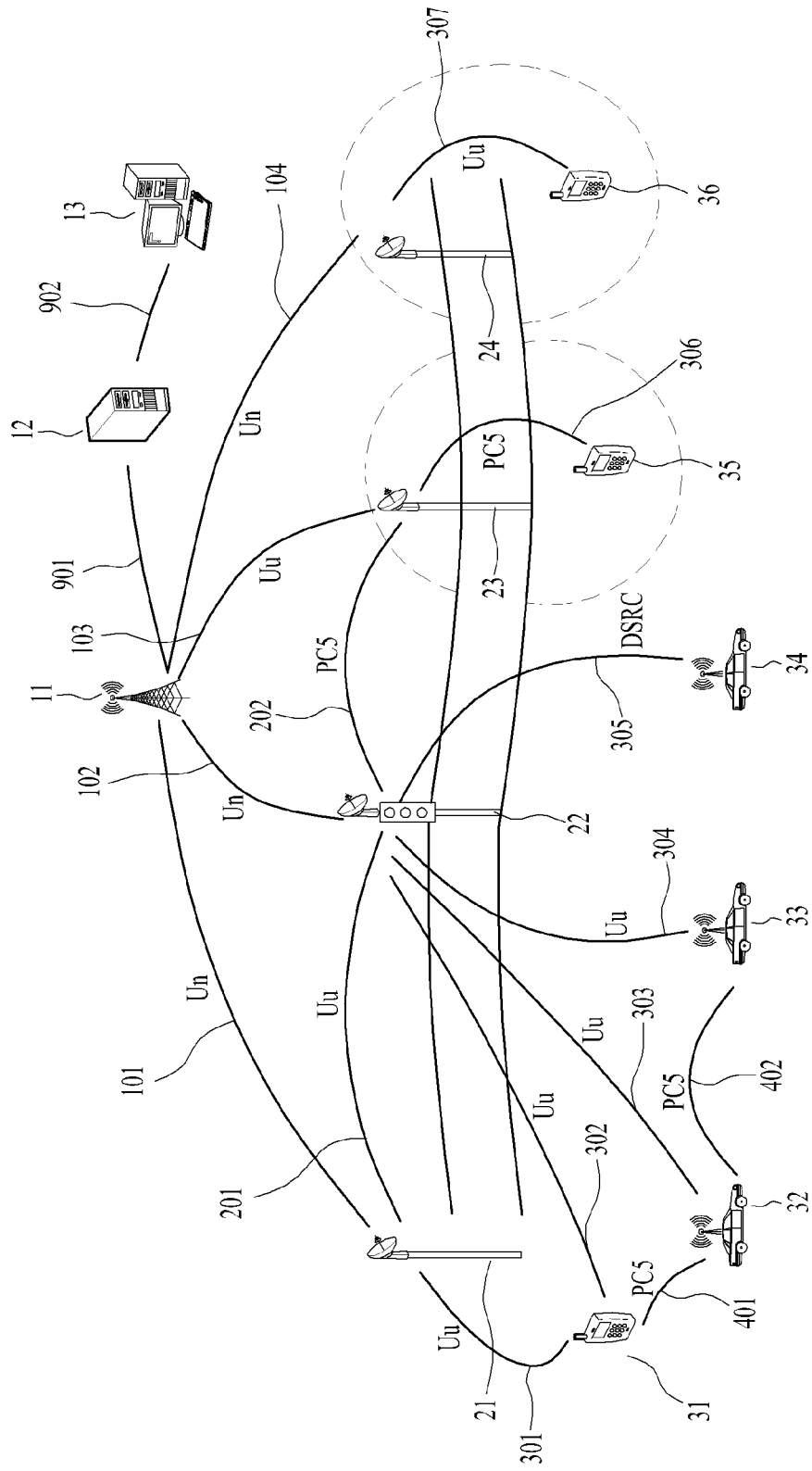
FIG. 10 is a diagram illustrating a further different infrastructure to which a proposed communication method is applied.

The V2X infrastructure shown in FIG. 8 can be variously changed according to a design change of a service provider as shown in FIGS. 9 and 10. In particular, it may change a configuration (or, reconfiguration). For example, an operation function of a node 21 or a node 22 may change, a communication interface between a node 11 and a node 21 may change, or an interface between a node 22 and a node 32 can be changed with an interface between a node 33 and a node 34.

FIGS. 9 and 10 are diagrams illustrating a different infrastructure to which a proposed communication method is applied. FIG. 9 shows an embodiment of changing a function of the node 21 in the infrastructure shown in FIG. 8 and FIG. 10 shows an embodiment of changing interfaces 101, 102, 201, 301, 302, 303 and 304 in the infrastructure shown in FIG. 8, respectively.

As mentioned in the foregoing description, an operation mode of a UE constructing a V2X infrastructure can be determined by at least one selected from the group consisting of the node 11, the node 12, and the node 13. The determined operation mode of the UE (or, an operation mode and an interface) are forwarded to the node 21, the node 22, the node 23, and the node 24. Unlike the abovementioned embodiment, when a triggering condition is generated in advance according to a prescribed criteria and the triggering condition is forwarded to the nodes 21 to 24, if the triggering condition is satisfied, the nodes 21 to 24 perform a function matched with the triggering condition (i.e., operate in a mode matched with the condition) or perform communication using an interface matched with the triggering condition.

For example, if the number of vehicles becomes equal to or less than a prescribed number in a region of a prescribed size managed by the node 22, the node 22 can configure the abovementioned case as the triggering condition. If the node 22 senses that the number of vehicles satisfies the triggering condition (i.e., if the number of vehicles increases more than a prescribed number or decreases less than the prescribed number), the node 22 performs an operation matched with the triggering condition. For example, if the triggering condition is satisfied, the node 22 can change an interface to the node 32, the node 33, and the node 34 to the Uu interface from the PC5 interface. Or, if the number of nodes intending to receive a communication service is equal to or greater than a prescribed number, the node 21 can configure the abovementioned case as a different triggering condition. Hence, if the node 21 performing an operation of an RSU function senses that the triggering condition is satisfied, the node 21 terminates the operation of the RSU function and may be able to initiate an operation as a relay node (21 of FIG. 9). An operation matched with a configuration of the triggering condition can be performed according to a configuration autonomously configured by the node 21, the node 22, or the like. Or, if the node 21 and the node 22 inform upper nodes (nodes 11, 12, and 13) of a situation that the triggering condition is satisfied and information on surroundings and receive a command in response to the information, the operation matched with the configuration of the triggering condition can be performed according to the command.

In the embodiments of FIG. 9 and FIG. 10, a UE operating as an RSU or a relay node can be implemented in various ways. For example, the UE receives a communication connectivity service from an eNB via the Un interface (104 of FIG. 10) and can provide a communication service to a different UE accessing the UE via the Uu interface (307 of FIG. 10). In this example, the UE plays a role of a relay node. As a different example, the UE may play a role of UE-to-network. In this case, the UE receives a communication connectivity service from an eNB via the Uu interface (103 of FIG. 10) and can provide a communication connectivity service to a different UE accessing the UE via the PC5 interface (306 of FIG. 10).

Figure 11:
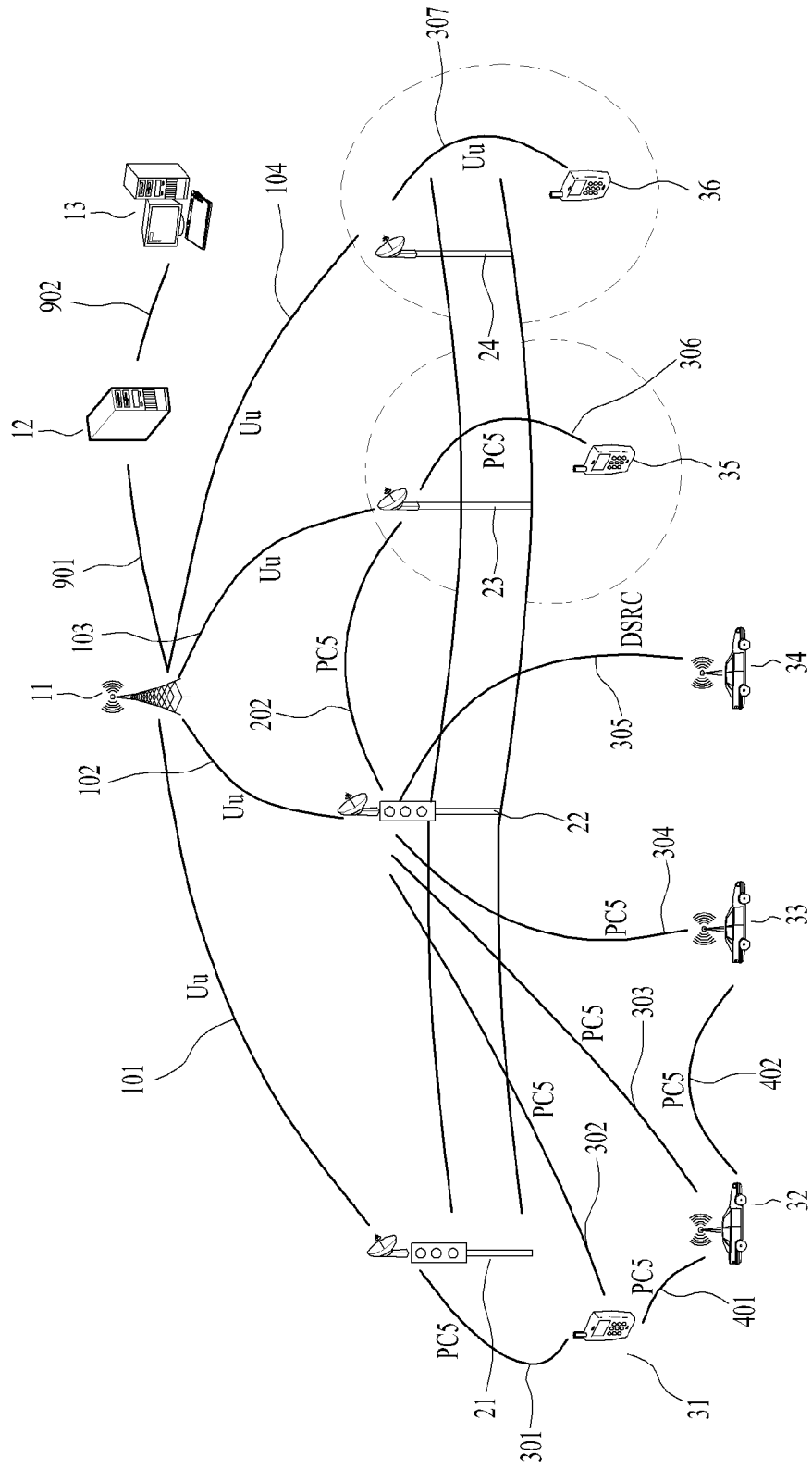
FIG. 11 is a diagram illustrating a further different infrastructure to which a proposed communication method is applied.

FIG. 11 is a diagram illustrating a different infrastructure to which a proposed communication method is applied. FIG. 11 shows an embodiment that a connection between an eNB and the nodes 21, 22, 23, and 24 is implemented by Uu interface.

In particular, FIG. 11 illustrates a shape of an infrastructure when the nodes 21 to 24 correspond to UEs not supporting Un interface with an eNB. In particular, FIG. 11 shows a case that the nodes 21 to 24 are not a relay node. In order for the nodes 21 to 24 to perform communication with the eNB using the Un interface, it is necessary for the nodes 21 to 24 to support a MBSFN-related function defined in 3GPP. In order to implement the MBSFN-related function, additional cost is required to implement a product compared to a terminal not supporting the Un interface. Hence, it may be able to configure the nodes 21 to 24 to perform communication with the eNB via the Uu interface only.

Figure 12:
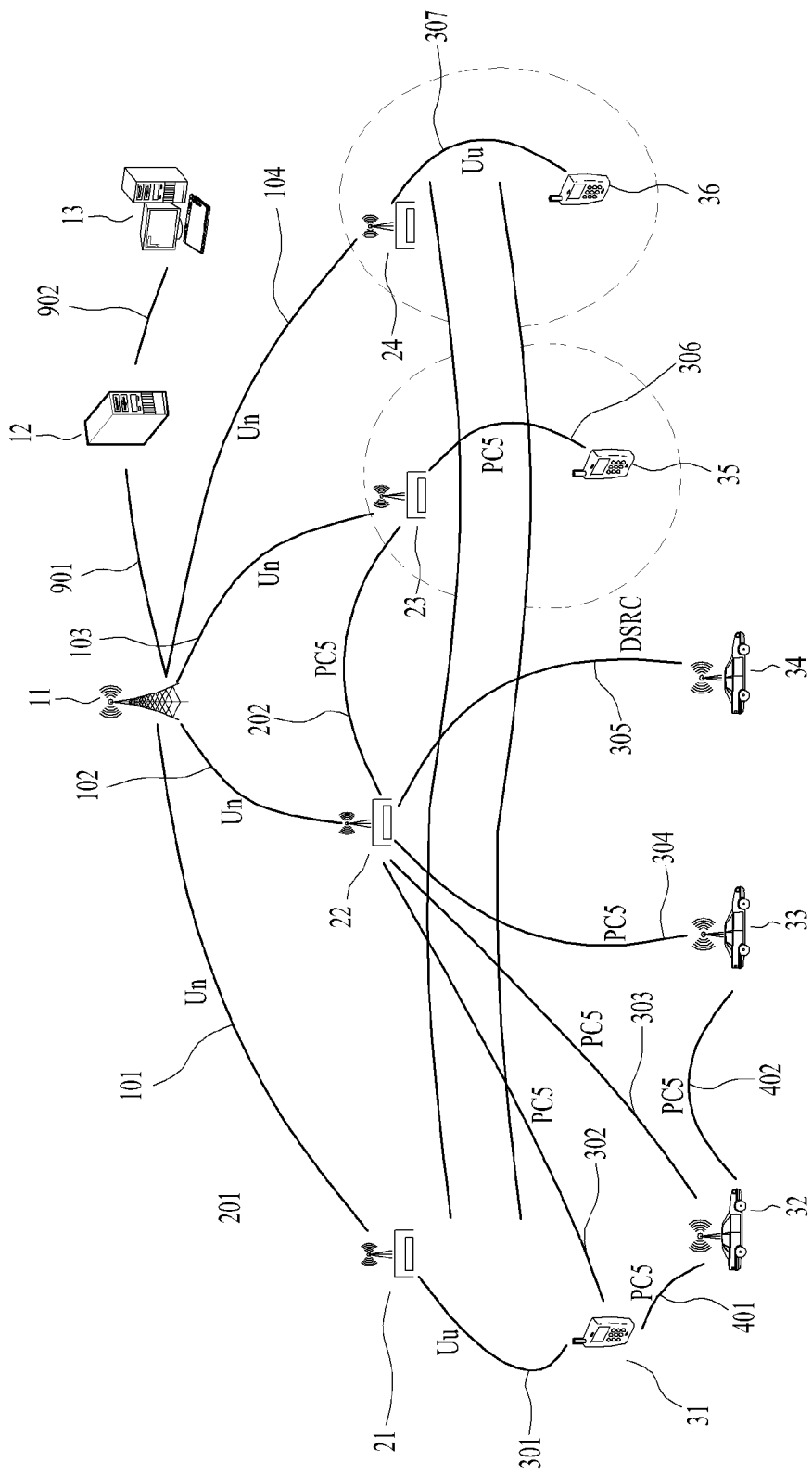
FIG. 12 is a diagram illustrating a further different infrastructure to which a proposed communication method is applied.

FIG. 12 is a diagram illustrating a different infrastructure to which a proposed communication method is applied. FIG. 12 shows an embodiment that the nodes 21 to 24 operate as a relay node supporting a MBSFN function of 3GPP.

In FIG. 12, if the nodes 21 to 24 are connected with the eNB via the Un interface, it may be able to configure the nodes 21 to 24 to perform communication with the eNB according to a MBSFN function. FIG. 12 shows a scenario that the nodes 21 to 24 operate as a relay node according to a MBSFN function.

Figure 13:
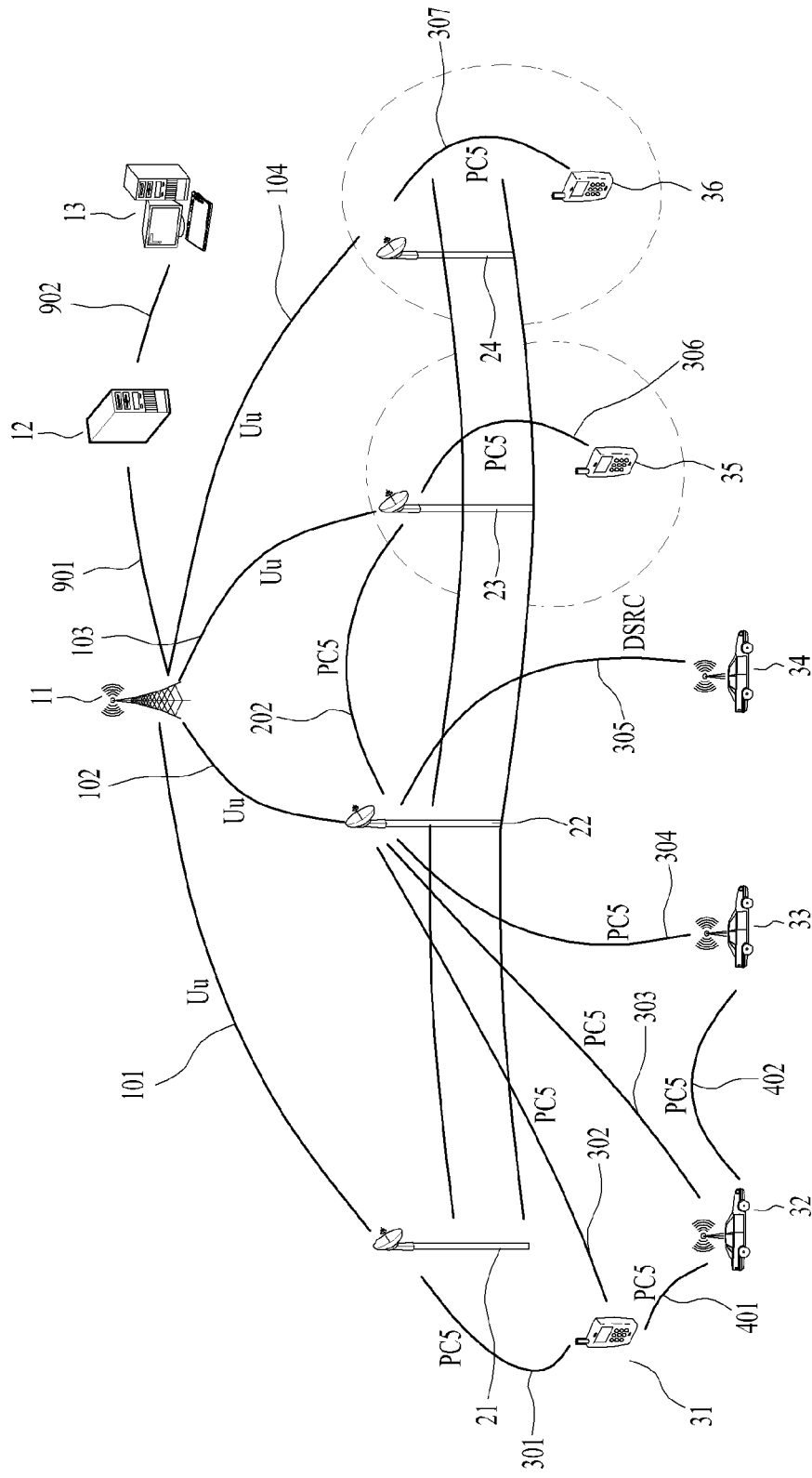
FIG. 13 is a diagram illustrating a further different infrastructure to which a proposed communication method is applied.
Figure 14:
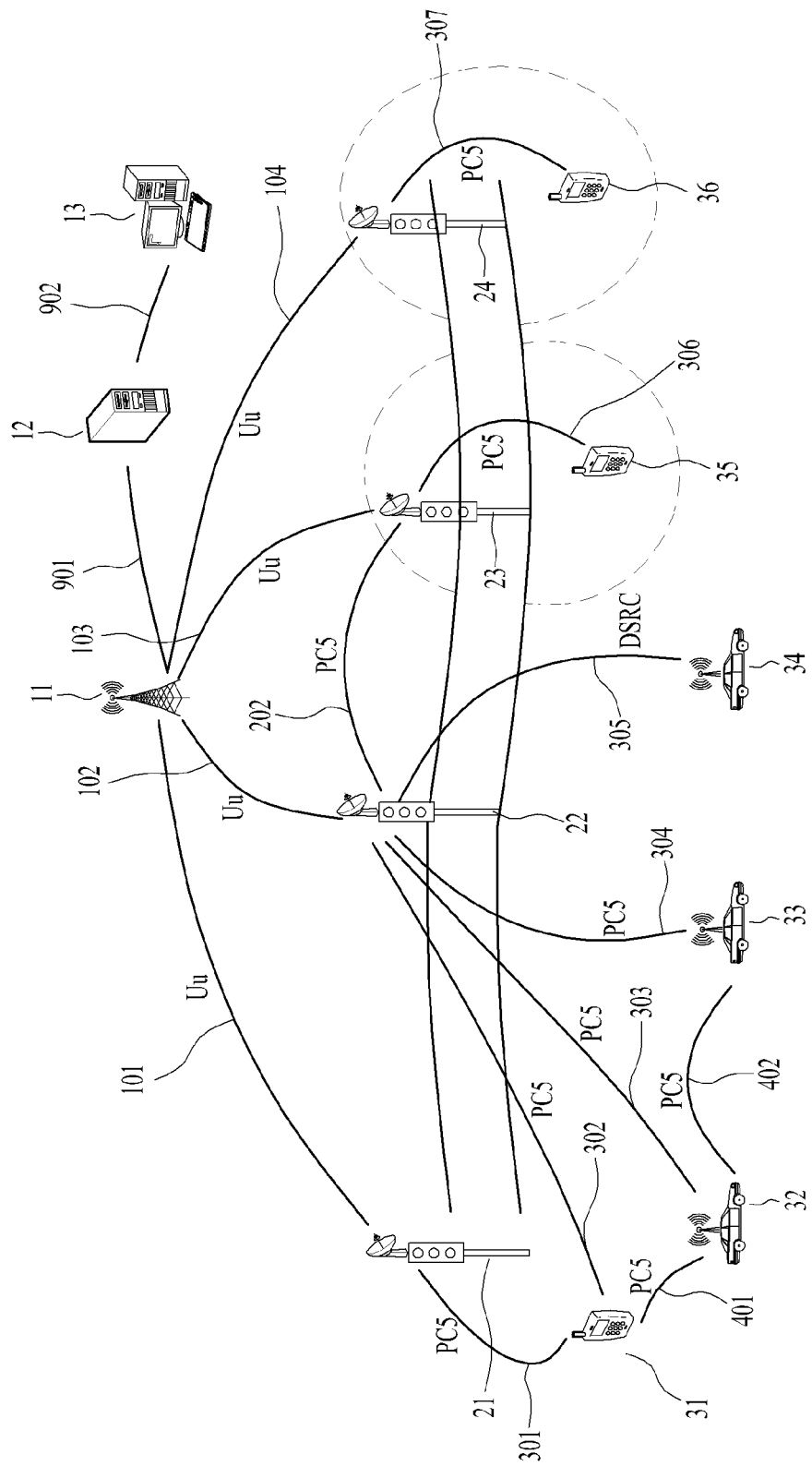
FIG. 14 is a diagram illustrating a further different infrastructure to which a proposed communication method is applied.
Figure 15:
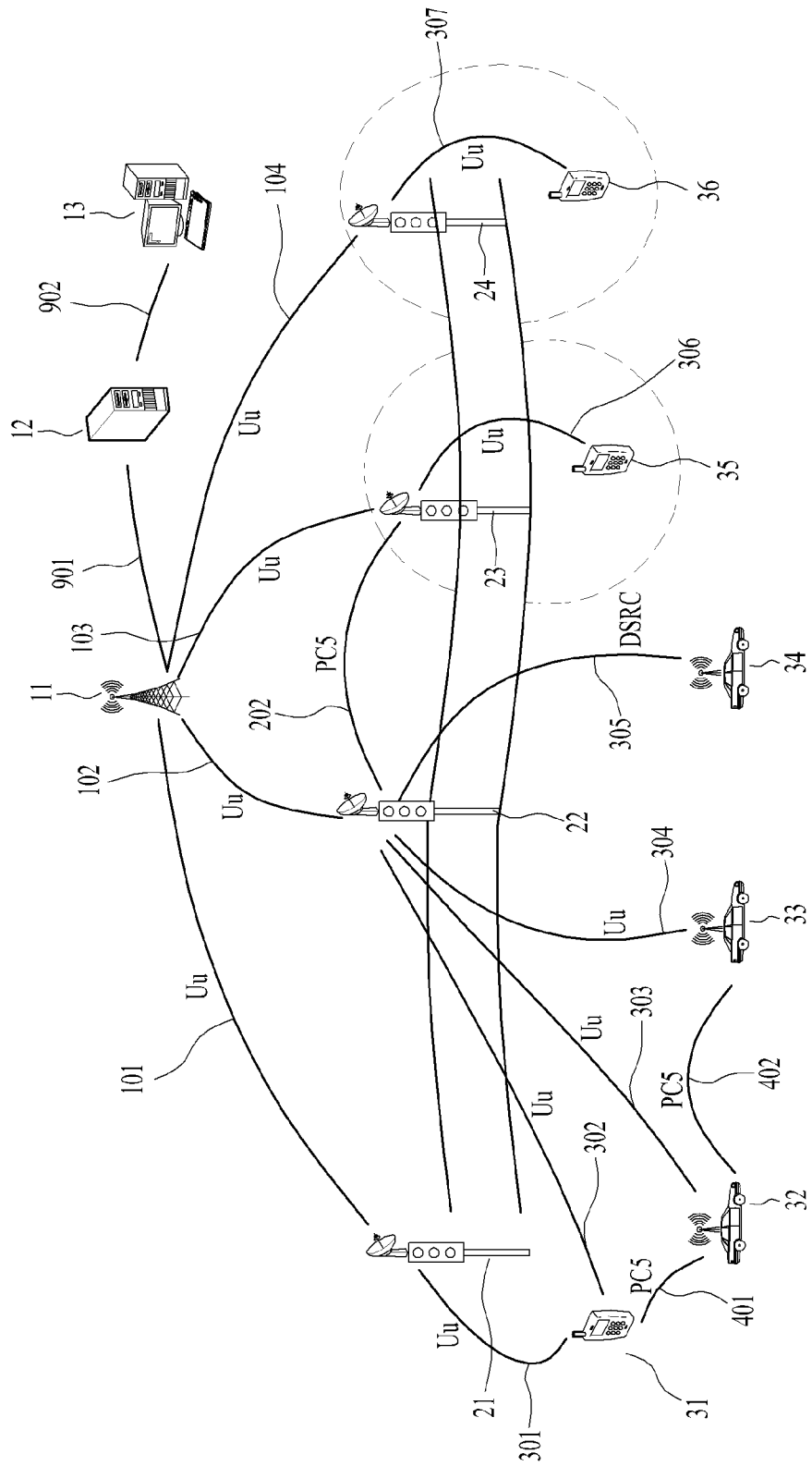
FIG. 15 is a diagram illustrating a further different infrastructure to which a proposed communication method is applied.

FIGS. 13 to 15 are diagrams illustrating a different infrastructure to which a proposed communication method is applied.

FIG. 13 illustrates an embodiment that all of the node 21, the node 22, the node 23, and the node 24 operate as a relay node and FIGS. 14 and 15 illustrate an embodiment that all of the node 21, the node 22, the node 23, and the node 24 operate as an RSU, respectively. The nodes 21 to 24 implemented by UEs operate according to a scheme configured by a communication network service provider or V2X service providers. The service provider may change an operation mode at a time while the nodes are operating. For example, as shown in FIG. 13, the network service provider or the V2X service provider may change or configure the nodes 21 to 24 operating as a relay node to operate as an RSU at a time.

And, as shown in FIGS. 14 and 15, the network service provider or the V2X service provider may change an interface at a time together with the operation mode of the nodes. For example, referring to FIG. 14, the nodes 21 to 24 perform communication with the eNB and other terminals via the Uu interface and the PC5 interface. On the contrary, referring to FIG. 15, the nodes 21 to 24 perform communication with other terminals via the Uu interface.

In addition to the aforementioned embodiments, if nodes implemented by UEs change an operation mode, information indicating a change of the operation mode, information on a mode to be changed, and the like can be transmitted to at least one selected from the group consisting of the node 11, the node 12, and the node 13. Various types of system information required by a changed operation mode can be provided together when an upper node indicates the UEs to change the operation mode. If each of nodes autonomously changes an operation mode according to a triggering condition, the system information can be obtained by requesting the system information to an upper node.

Figure 16:
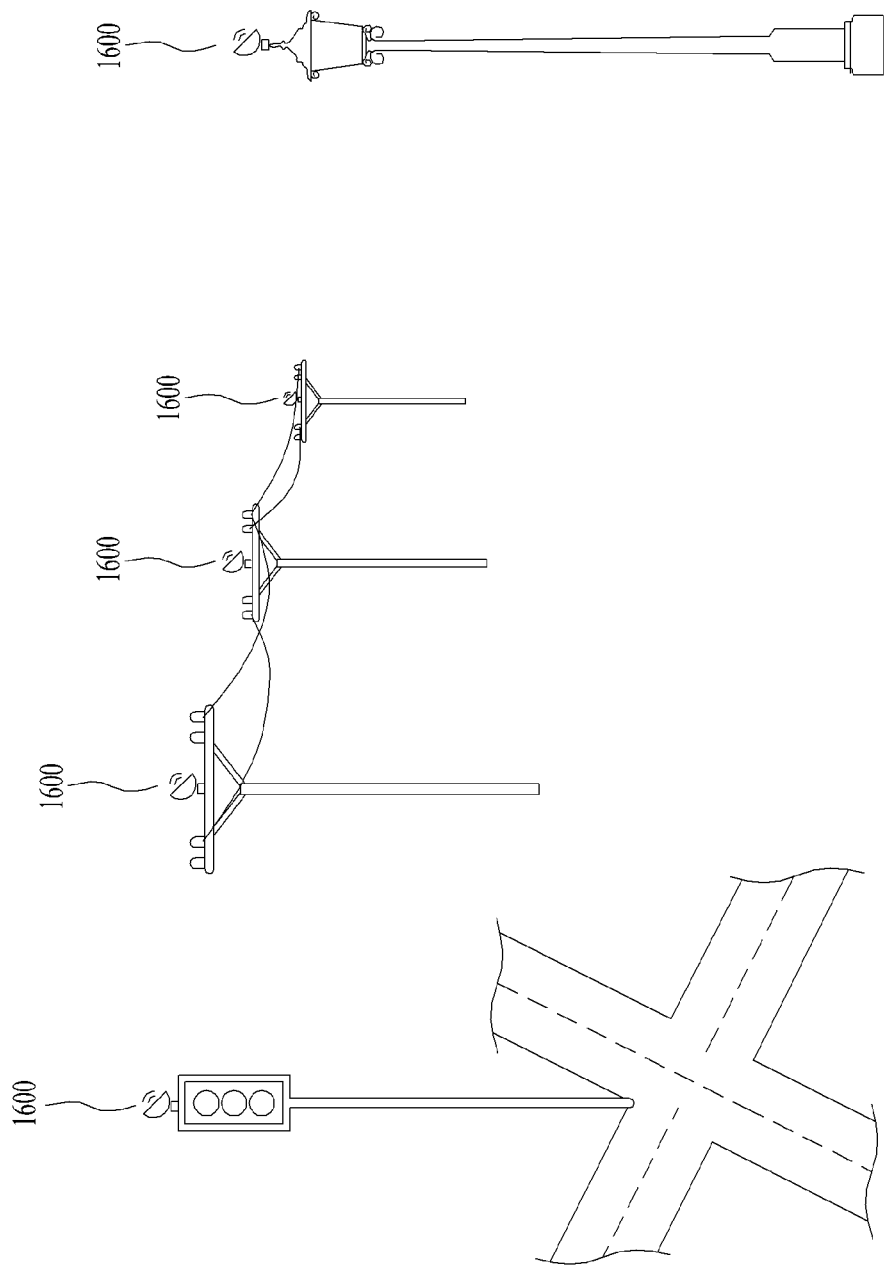
FIG. 16 is a diagram illustrating a further different infrastructure to which a proposed communication method is applied.

FIG. 16 is a diagram illustrating a different infrastructure to which a proposed communication method is applied. FIG. 16 shows examples of various infrastructures that a node performing an RSU function is implemented.

FIG. 16 illustrates examples that a UE is installed in various facilities near road including a traffic light, an electric pole, a streetlight, and the like. In particular, the UE operates as an RSU in a manner of being installed in the facilities near road and forms a part of a V2X communication network. Since the UE has advantages such as a compact size, a low installation cost, a low management cost, and the like, the UE can be easily installed in various places.

UEs are remotely managed by a V2X/ITS service provider or a network manager. For example, when a UE operates as an RSU, the V2X/ITS service provider or the network manager remotely controls an interface to be used for the UE to access a cellular network or an internet service network, an interface to be used for the UE to provide a service to neighboring UEs, and a function among a function of an RSU and a function of a relay node to be performed by the UE. And, the UE may operate with a specific function and an interface according to a triggering condition which is determined in consideration of a surrounding environment change in advance. The UE may operate according to a new configuration indicated by the manager/service provider while performing a prescribed operation.

Figure 17:
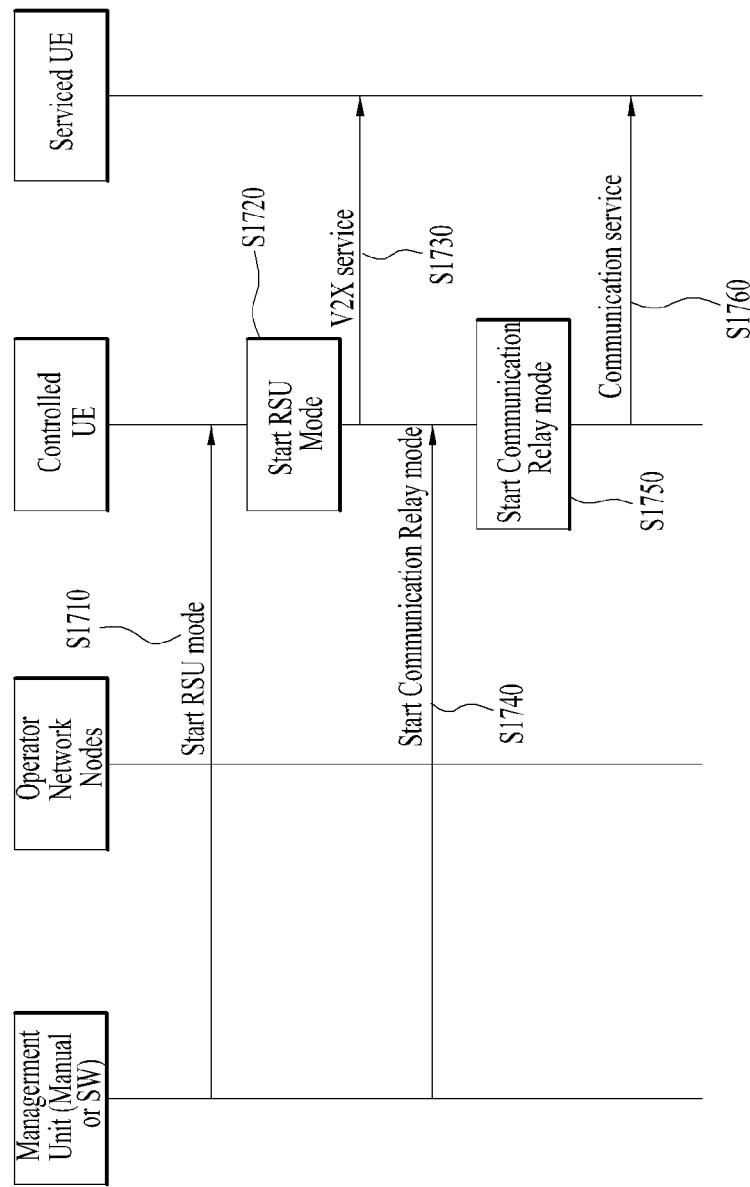
FIG. 17 is a flowchart for a method of performing communication according to one embodiment of the present invention.

FIG. 17 is a flowchart for a method of performing communication according to one embodiment of the present invention.

In FIG. 17, a management unit corresponds to a service provider or a manager of a core network and corresponds to the node 12 or the node 13 in FIGS. 8 to 15. Operator network nodes correspond to a communication network that connects the core network and a UE. The operator network nodes may correspond to a backbone network consisting of an eNB, an MME, and the like and correspond to the node 11 of FIGS. 8 to 15. In FIG. 17, a controlled UE corresponds to a UE installed by a service provider/manager and the UE operating as an RSU or a relay node. The controlled UE corresponds to the node 21, the node 22, the node 23, and the node 24 in FIGS. 8 to 15. A serviced UE corresponds to a UE receiving a service by accessing an RSU or a relay node. The serviced UE corresponds to the node 31, the node 32, the node 33, the node 34, the node 35, and the node 36 in FIGS. 8 to 15.

FIG. 17 illustrates an embodiment of remotely controlling or configuring an operation of a UE to construct V2C network. A management unit corresponds to an entity configured to remotely transmit a command. The management unit is manually controlled by a user or can be implemented using a designated software operation. As shown in the example of FIG. 17, the management entity (management unit) transmits a message to an installed UE (controlled UE) to indicate the UE to initiate an RSU mode [S1710]. Or, the management entity transmits a message to the installed UE to indicate the UE to initiate a communication relay mode [S1740]. For example, a command transmitted by the management entity is forwarded to the (controlled) UE via network nodes (operator network nodes) such as EPC of 3GPP, E-UTRAN, etc. The command transmitted by the management entity can include not only information indicating the RSU mode or the relay mode but also information indicating an interface to be used for each mode.

Having received the control command, the UE operates in the RSU mode to perform an RSU function [S1720] and provides a V2X service to neighboring UEs [S1730]. Or, the UE operates in the relay mode to perform a communication relay function [S1750] and provides a communication service to neighboring UEs [S1760]. In the steps S1720 to S1760, if the UE receives a new command from the network, the UE may change the operation mode and the interface according to the indication indicated by the new command. In particular, when the UE operates as an RSU, if the network indicates the UE to operate as a relay node, the UE initiates an operation in the relay mode and provides a communication relay function to a neighboring UE using a newly configured interface in the relay mode.

Figure 18:
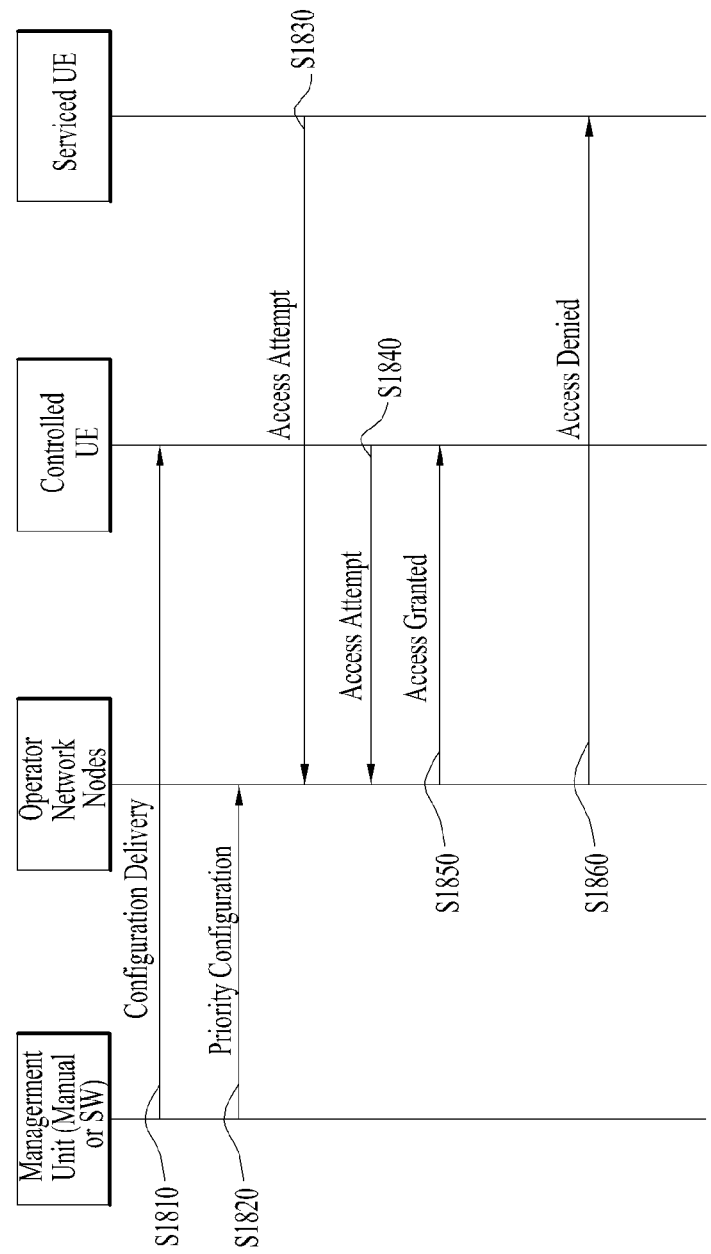
FIG. 18 is a flowchart for a method of performing communication according to a different embodiment of the present invention.

FIG. 18 is a flowchart for a method of performing communication according to a different embodiment of the present invention.

An embodiment of FIG. 18 illustrates a procedure for a service provider to preferentially allow UEs, which are installed to construct a network, to perform access compared to other UEs. For example, when a cell does not have sufficient resources, a radio resource can be preferentially allocated to a UE (controlled UE) which is installed to construct a network. If a plurality of UEs request access at the same time, access can be preferentially permitted to the UE which is installed to construct the network.

As mentioned in the foregoing description, in order to preferentially process the controlled UE, it may assign an identifier distinguished from an identifier of a normal UE to the controlled UE. In particular, the management entity may assign an identifier distinguished from identifiers of other UEs to a UE directly installed by the management entity. Or, the management entity may notify that the controlled UE corresponds to a UE of a special type [S1810]. Meanwhile, the management entity can transmit configuration information to a network node (eNB, MME, etc.) to inform the network node that it is necessary to preferentially process the UE installed to construct the network prior to other UEs [S1820].

Having received the identifier distinguished from the identifiers of other UEs, the UE may inform the network node of the assigned identifier when the UE requests access to the network node. Or, the UE may inform the network node that the UE corresponds to a UE of a type for constructing a network [S1840]. When the network node receives an attach request from the UE, if the attach request includes a special identifier or indicates that the attach request corresponds to an attach request of a special type UE, the network node allows the UE to preferentially perform access [S1850]. For example, information indicating the UE of the special type may correspond to information indicating a UE operating as an RSU or a relay node.

On the contrary, other UEs (serviced UEs) receive a service from the UE for constructing the network by accessing the UE. When the serviced UEs request access to the network node, since the serviced UEs do not transmit a special identifier to the network node and do not inform the network node that the serviced UEs correspond to UEs of a special type [S1840], the network node may not permit the serviced UEs to perform access to preferentially permit the UE for constructing the network to perform access [S1860].

Having received the information indicating that the access-permitted UE corresponds to the UE for constructing the network, the network nodes can preferentially allocate a radio resource to the access-permitted UE prior to a normal UE. As mentioned in the foregoing description, in order to preferentially support the access-permitted UE, a network manager, a service provider, which has performed network installation, or a network node informs other network nodes managing UEs of information indicating that the UE installed for constructing the network corresponds to a UE to which access is preferentially supported or information indicating that the UE corresponds to a UE performing a special operation. Hence, the network nodes may preferentially allocate a radio resource to the UE installed to construct the network or perform priority handling to preferentially permit access to the UE.

Figure 19:
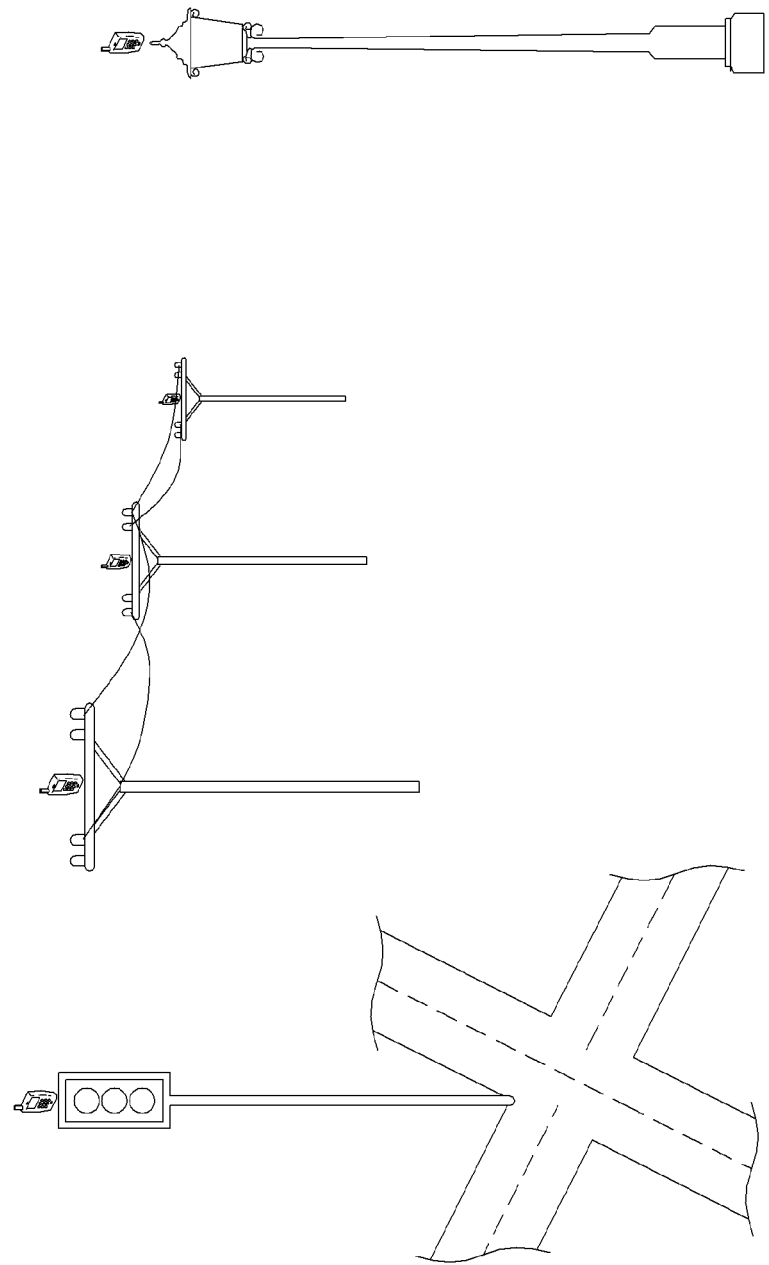
FIG. 19 is a diagram illustrating a further different infrastructure to which a proposed communication method is applied.
Figure 20:
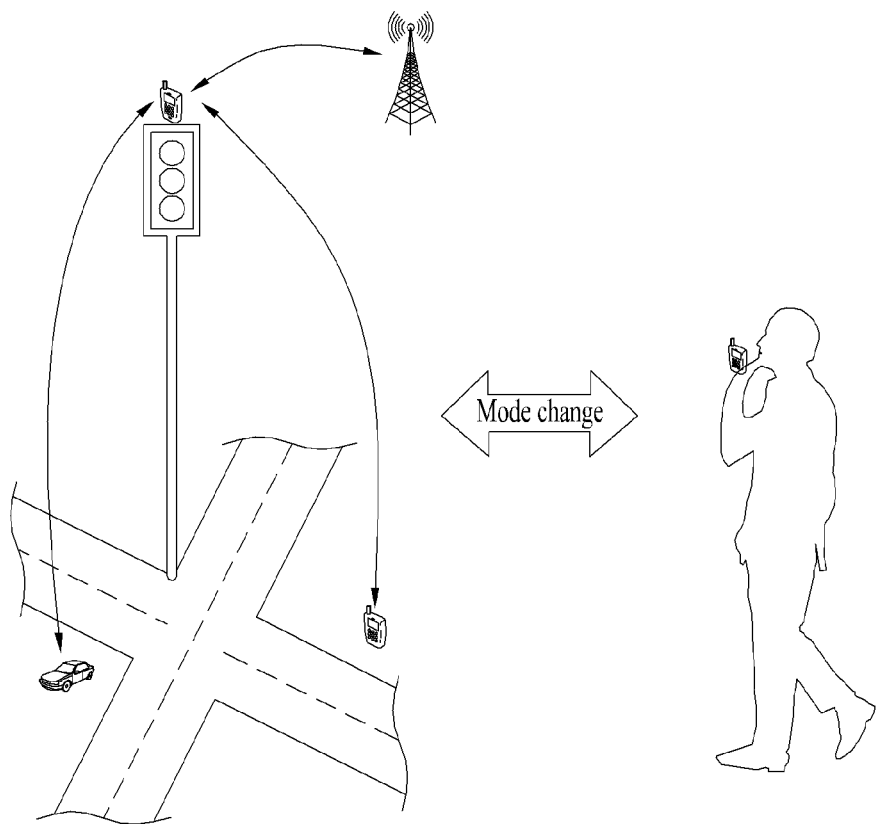
FIG. 20 is a diagram illustrating a further different infrastructure to which a proposed communication method is applied.

FIGS. 19 and 20 are diagrams illustrating a further different infrastructure to which a proposed communication method is applied.

FIG. 19 illustrates a further different embodiment of constructing a V2X network using UEs. The UEs described in FIG. 19 are different from the UEs described in FIG. 16 in that such UEs directly handled by users as smartphones are able to configure the V2X network in a manner of being installed in facilities near road. In other word, it is not necessary for a service provider/manager to newly design and produce a UE operating as an RSU or a relay node. In particular, a terminal currently on the markets can be utilized for constructing a network. In general, when smartphones receive a service by accessing an eNB, if the smartphones are installed in a traffic light, an electric pole, a streetlight, and the like, the smartphones can be utilized as an infrastructure of V2X communication, a communication relay, a communication base station, and the like (FIG. 19).

If a base station is installed in a location near a position where a smartphone is installed or it is not necessary for a smartphone to play a role of a V2X infrastructure anymore due to a change of surrounding environment, a manager/service provider, which has installed the smartphone, removes the smartphone and may reuse the smartphone as a general terminal (e.g., a personal smartphone of a user). In particular, if a pedestrian/user carries a smartphone, the smartphone operates as a personal smartphone of the pedestrian/user. If a smartphone is installed in a specific place and is remotely controlled by a management entity, the smartphone operates as an infrastructure that constructs a part of a network as an RSU or a relay node (FIG. 20).

Meanwhile, if a UE is installed in a traffic light, a streetlight, an electric pole, and the like, it is necessary to install software for connecting power and communication in the UE. If the UE is installed via the abovementioned procedure, the UE is remotely controlled and managed by V2X/ITS service provider or a network manager. For example, the V2X/ITS service provider or the network manager remotely controls an interface to be used for the UE to access a cellular network or an internet service network, an interface to be used for the UE to provide a service to neighboring UEs, and a function among a function of an RSU and a function of a relay node to be performed by the UE. The UE may operate according to a new configuration configured according to surroundings and a predetermined criteria or an involvement of a user while performing a prescribed operation.

An example of a scenario to which the aforementioned embodiments are applicable is explained. It may consider a case that it is necessary for a pedestrian to charge a smartphone of the pedestrian while using the smartphone. A manager/service provider can install a battery charging spot in a place where an additional RSU needs to be installed in an infrastructure having a large floating population/vehicle.

The pedestrian may leave the smartphone of the pedestrian at the battery charging spot to charge the battery for free. While the smartphone is charging, the smartphone of the pedestrian may operate as an RSU or a relay node according to a control command of the management entity. In order to control the smartphone by the management entity, it may temporarily install prescribed software in the smartphone. If the charging is completed, if the pedestrian wants to get the smartphone back, or if prescribed time elapses, the temporarily installed software is deleted.

In particular, if the smartphone of the pedestrian is utilized, the manager/service provider can obtain an effect of improving a communication network without installing an additional UE. Moreover, since the pedestrian is able to charge the battery for free, the pedestrian is not pressured by providing the smartphone of the pedestrian for prescribed time. Hence, both the manager/service provider and the pedestrian can obtain a gain.

Figure 21:
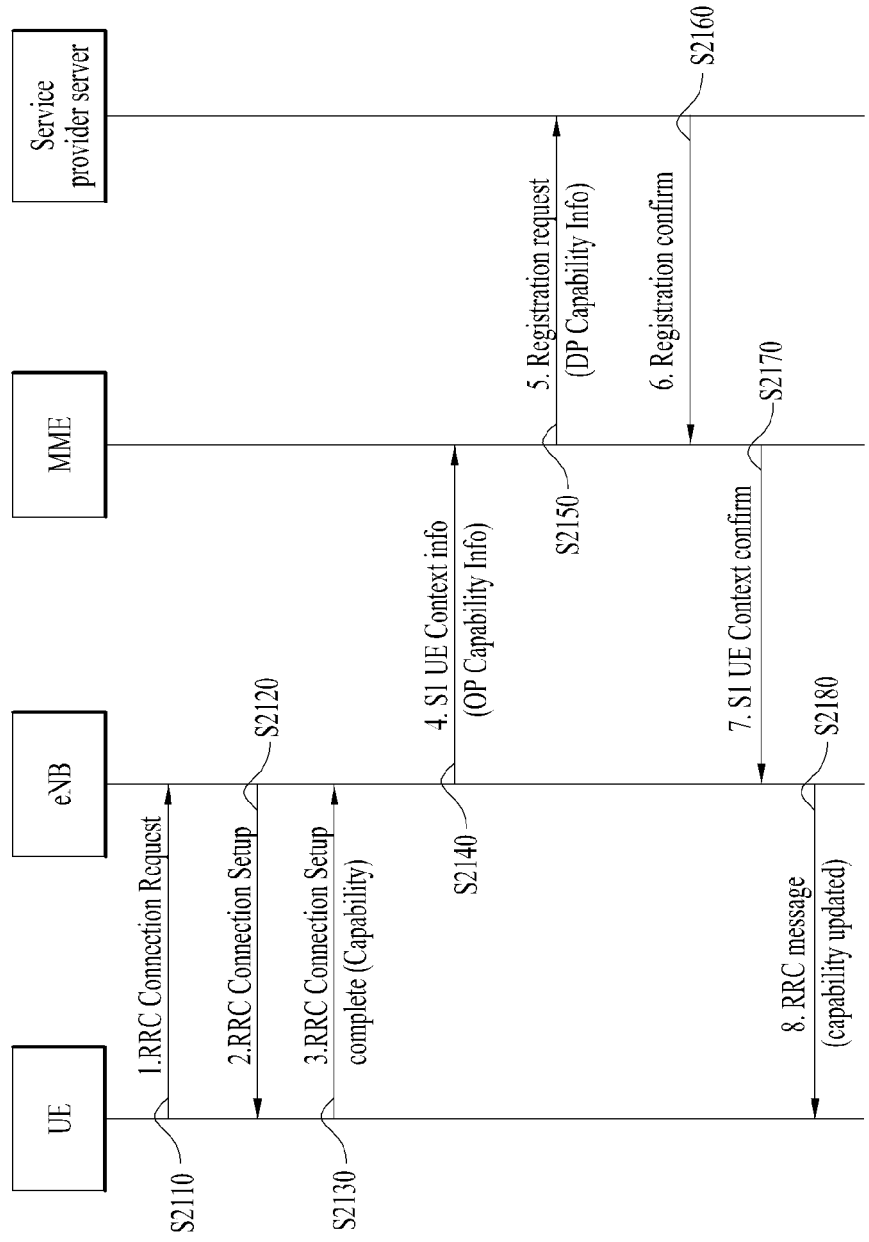
FIG. 21 is a flowchart for a method of performing communication according to a further different embodiment of the present invention.
Figure 22:
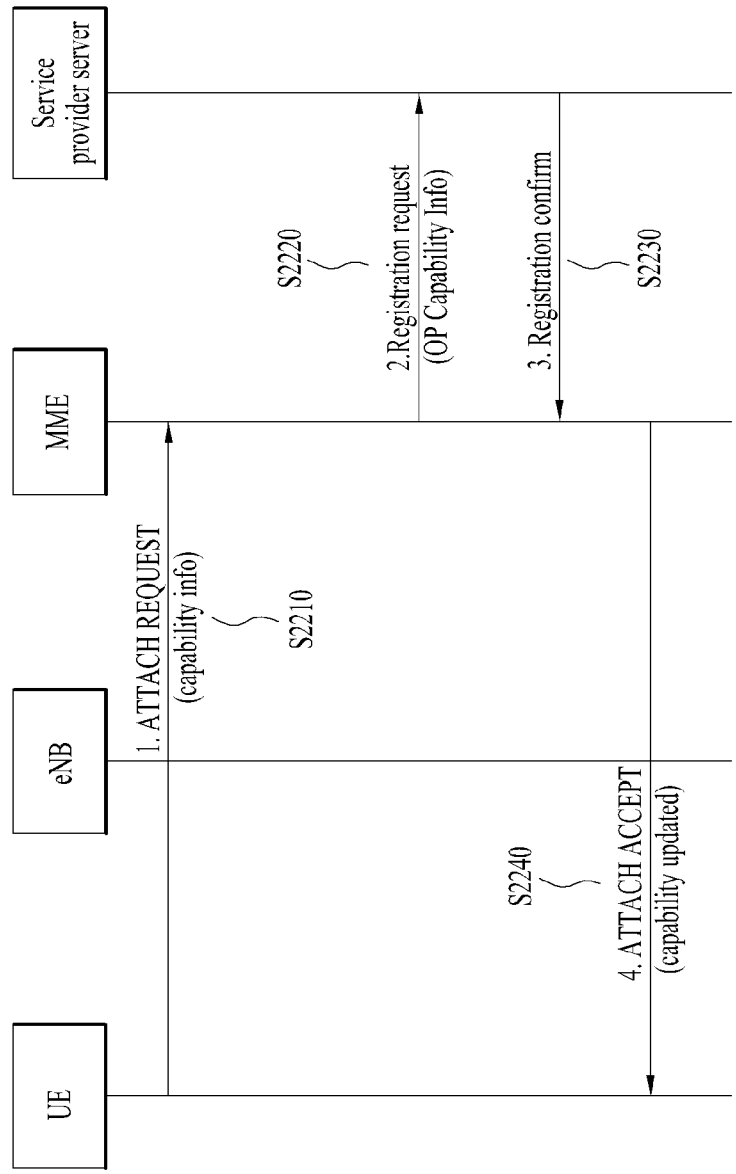
FIG. 22 is a flowchart for a method of performing communication according to a further different embodiment of the present invention.
Figure 23:
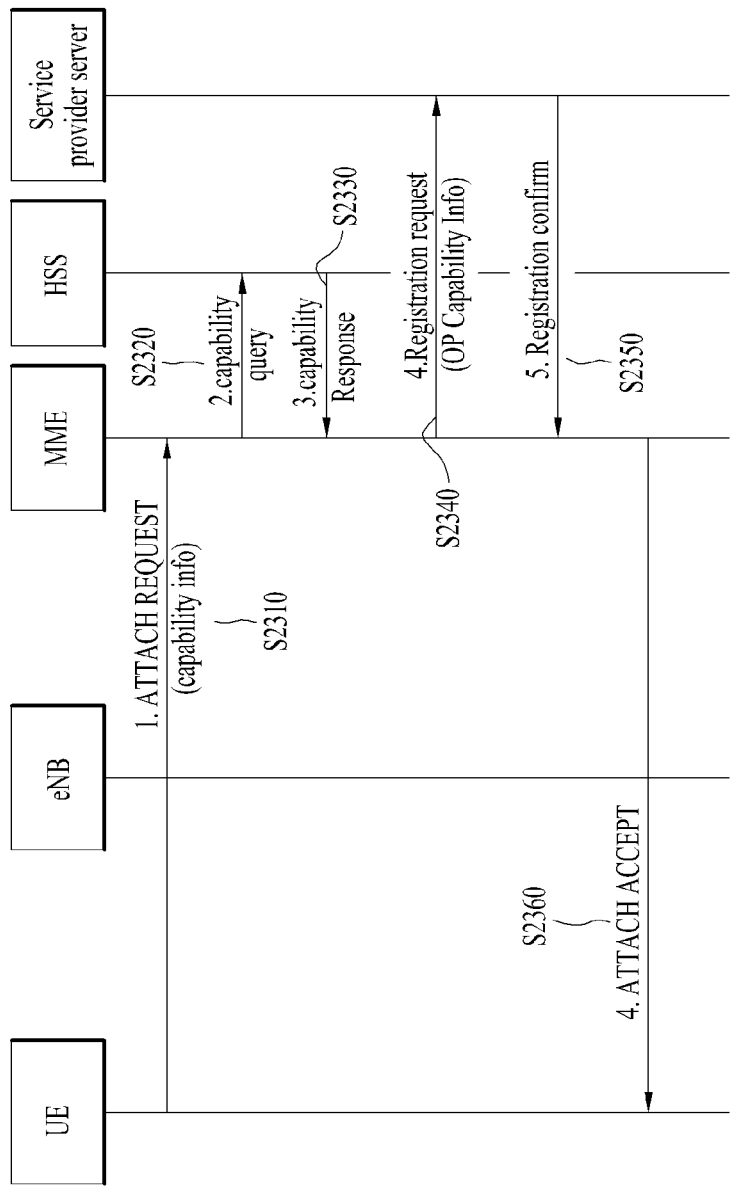
FIG. 23 is a flowchart for a method of performing communication according to a further different embodiment of the present invention.

FIGS. 21 to 23 are flowcharts for a method of performing communication according to a further different embodiment of the present invention. In FIG. 8, a procedure for informing network nodes of information on capability of a UE capable of operating as an RSU or a relay node has been briefly explained. In the following, a procedure for transmitting and receiving the capability is explained in detail with reference to FIGS. 21 to 23.

First of all, FIG. 21 illustrates a method of transmitting and receiving capability of a UE in an RRC connection request procedure. A UE capable of operating as an RSU or a relay node transmits an RRC connection request message to an eNB to establish an RRC connection with the eNB [S2110]. Having received the RRC connection request message, the eNB transmits an RRC connection configuration message to the UE in response to the RRC connection request message [S2120].

Meanwhile, if the UE, which has received the RRC connection configuration message, corresponds to a UE capable of operating as an RSU or a relay node, the UE includes information (i.e., capability information) indicating that the UE is able to operate as an RSU or a relay node in an RRC connection configuration completion message and transmits the RRC connection configuration completion message to the eNB [S2130]. Having received the capability information, the eNB forwards the received capability information to an MME by including the capability information in an S1 UE context information message [S2140]. The MME is able to recognize that the UE accessed via the eNB is able to play a role of an RSU or a relay node.

Meanwhile, the MME transmits a registration request message to a management server of a service provider to transmit the capability information of the UE [S2150]. The management server of the service provider transmits a registration confirmation message to the MME in response to the registration request message [S2160]. After the completion of the registration of the UE is recognized, the MME transmits an S1 UE context confirmation message to the eNB to inform the eNB that the capability information of the UE is confirmed [S2170]. The eNB transmits an RRC message to the UE to inform the UE that the capability information of the UE is updated [S2180].

The eNB, the MME, and the management server of the service provider obtain information on an accessed UE and information on whether or not the accessed UE is able to operate as an RSU or a relay node through the abovementioned procedures. Subsequently, the management server of the service provider (or, a core network) remotely controls UEs, which have transmitted capability information, capable of operating as an RSU or a relay node only.

FIG. 22 illustrates a method of transmitting and receiving capability information of a UE in an attach request procedure. In FIG. 22, an embodiment of using a NAS message rather than an RRC connection procedure is explained.

A UE capable of operating as an RSU or a relay node establishes an RRC connection with an eNB. After the RRC connection is established, the UE transmits an attach request message to an MME [S2210]. The attach request message can include capability information indicating that the UE is able to operate as an RSU or a relay node.

The MME forwards the received capability information to a management server of a service provider [S2220] and receives a confirmation response message from the management server of the service provider which has stored the capability information of the UE [S2230]. Having received the confirmation response message, the MME transmits an attach accept message to the UE to inform the UE that the capability information is registered/updated [S2240].

In the foregoing procedure, it may use a different type of a NAS message used in a TAU procedure instead of the attach request procedure. And, a UE may transmit capability information of the UE to a network whenever the UE accesses the network. On the other hand, it may also be able to implement a scheme that the network utilizes capability information of the UE stored in the network.

FIG. 23 illustrates a method of transmitting and receiving capability initiated by a network.

A UE establishes an RRC connection with an eNB and then transmits an attach request message to an MME [S2310]. The MME requests context information of the UE to an HSS using an identifier of the UE which has transmitted the attach request message [S2320]. The HSS transmits the context information of the UE to the MME in response to the request of the MME [S2330]. The context information of the UE includes subscriber information of the UE and capability information indicating that the UE is able to operate as an RSU or a relay node.

The MME identifies the capability information of the UE according to the information received from the HSS. The MME informs a management server of a service provider that the UE capable of operating as an RSU or a relay node has accessed a network and requests registration of the UE [S2340]. If the registration of the UE is confirmed by the management server of the service provider [S2350], the MME transmits an attach accept message to the UE to inform the UE that the attach procedure is successfully completed [S2360].

In the step S2320, if the management server of the service provider possesses identifiers and capability information of UEs installed by the management server, the MME may directly request the capability information of the UE to the management server of the service provider. In this case, the steps S2340 to S2350 can be omitted.

4. Device Configurations

Figure 24:
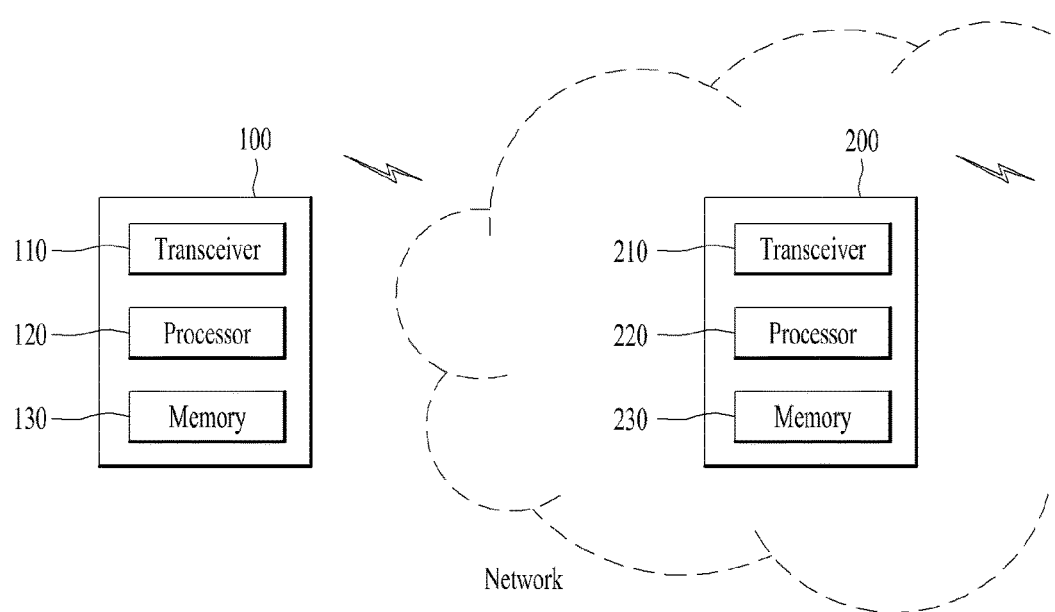
FIG. 24 is a diagram for configurations of a user equipment and a base station according to a proposed embodiment.

FIG. 24 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 24, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

Although the V2X communication method are described centering on examples applied to 3GPP LTE system, it may also be applicable to various wireless communication systems including IEEE 802.16x and 802.11x system. Moreover, the proposed method can also be applied to mmWave communication system using a microwave frequency band.

What is claimed is:

1. A method of communication, performed by a user equipment (UE) with network nodes in a vehicle to everything (V2X) communication environment, the method comprising:
    transmitting to a network entity, a first message comprising capability information of the UE operating as a road side unit (RSU) for providing an intelligent transport system (ITS) service and as a relay node for providing a mobile communication service;
    receiving from a base station, a second message indicating to the UE to operate as the RSU or the relay node; and
    performing communication with the base station and a different UE by operating as the RSU or the relay node according to the second message,
    wherein the V2X UE operating as the RSU communicates with the base station based on a Uu interface or a PC5 interface, and
    wherein the V2X UE operating as the relay node communicates with the base station based on a Un interface.

2. The method of claim 1, wherein the second message further comprises information on an interface to be used for a procedure of operating as the RSU or the relay node.

3. The method of claim 2, wherein the information on the interface comprises information on an interface to be used for performing communication with the base station and information on an interface to be used for performing communication with the different UE.

4. The method of claim 1, further comprising:
    receiving a configuration of an identifier of the UE capable of operating as the RSU or the relay node from an entity managing the ITS service; and
    accessing the base station using the identifier.

5. The method of claim 4, wherein when the UE accesses the base station using the identifier, access is preferentially permitted to the UE compared to a UE not using the identifier.

6. The method of claim 1, wherein when the network entity recognizes the UE capable of operating as the RSU or the relay node, the base station preferentially allocates a radio resource to the UE.

7. The method of claim 1, wherein the receiving the second message and the performing the communication are performed by an application temporarily installed in the UE while the UE is charged using an external power source.

8. The method of claim 1, wherein the network entity corresponds to the base station or a mobility management entity (MME).

9. A user equipment (UE) performing communication with network nodes in a vehicle to everything (V2X) communication environment, the UE comprising:
    a transmitter;
    a receiver; and
    a processor operates in a manner of being connected with the transmitter and the receiver, wherein the processor:
    controls the transmitter to transmit a first message comprising capability information of the UE operating as a road side unit (RSU) for providing an intelligent transport system (ITS) service and as a relay node for providing a mobile communication service,
    controls the receiver to receive a second message indicating to the UE to operate as the RSU or the relay node from a base station, and performs communication with the base station and a different UE by operating as the RSU or the relay node according to the second message, wherein the V2X UE operating as the RSU communicates with the base station based on a Uu interface or a PC5 interface, and wherein the V2X UE operating as the relay node communicates with the base station based on a Un interface.

10. A method of communication, performed by a user equipment (UE) with network nodes in a vehicle to everything (V2X) communication environment, the method comprising:

transmitting a message comprising capability information of the UE operating as a road side unit (RSU) for providing an intelligent transport system (ITS) service and as a relay node for providing a mobile communication service;

setting a triggering condition for initiating an operation as the RSU or the relay node; and when the triggering condition is satisfied, performing communication with a base station and a different UE by operating as the RSU or the relay node, wherein when the number of vehicles located within a region managed by the UE is equal to or greater than a first threshold value, the triggering condition is configured to make the UE operate as the RSU, and wherein when the number of vehicles is less than a second threshold value, the triggering condition is configured to make the UE operate as the relay node.

11. The method of claim 10, wherein an interface to be used for a procedure of operating as the RSU or the relay node is configured together with the triggering condition.

12. A user equipment (UE) performing communication with network nodes in a vehicle to everything (V2X) communication environment, the UE comprising:

a transmitter;

a receiver; and a processor operates in a manner of being connected with the transmitter and the receiver, wherein the processor:

controls the transmitter to transmit a message comprising capability information of the UE operating as a road side unit (RSU) for providing an intelligent transport system (ITS) service and as a relay node for providing a mobile communication service, sets a triggering condition for initiating an operation as the RSU or the relay node, and when the triggering condition is satisfied, performs communication with a base station and a different UE by operating as the RSU or the relay node, wherein when the number of vehicles located within a region managed by the UE is equal to or greater than a first threshold value, the triggering condition is configured to make the UE operate as the RSU, and wherein when the number of vehicles is less than a second threshold value, the triggering condition is configured to make the UE operate as the relay node.

13. A method of communication, performed by a user equipment (UE) with network nodes in a vehicle to everything (V2X) communication environment, the method comprising:

transmitting a first message containing capability information of the UE operating as a road side unit (RSU) for providing an intelligent transport system (ITS) service and as a relay node for providing a mobile communication service;

receiving a second message indicating to the UE to operate as the RSU or the relay node from a base station; and performing communication with the base station and a different UE by operating as the RSU or the relay node according to the second message, wherein, when an identifier of the UE capable of operating as the RSU or the relay node is configured by an entity managing the ITS service, performing the communication with the base station comprises the step of accessing the base station using the identifier, and wherein, when the UE accesses the base station using the identifier, access is preferentially permitted to the UE compared to a UE not using the identifier, wherein the V2X UE operating as the RSU communicates with the base station based on a Uu interface or a PC5 interface, and wherein the V2X UE operating as the relay node communicates with the base station based on a Un interface.

14. A user equipment (UE) performing communication with network nodes in a vehicle to everything (V2X) communication environment, the UE comprising:

a transmitter;

a receiver; and a processor operates in a manner of being connected with the transmitter and the receiver, wherein the processor:

controls the transmitter to transmit a first message containing capability information of the UE operating as a road side unit (RSU) for providing an intelligent transport system (ITS) service and as a relay node for providing a mobile communication service, controls the receiver to receive a second message indicating to the UE to operate as the RSU or the relay node from a base station, and performs communication with the base station and a different UE by operating as the RSU or the relay node according to the second message, and wherein, when an identifier of the UE capable of operating as the RSU or the relay node is configured by an entity managing the ITS service, accesses the base station using the identifier, and wherein, when the UE accesses the base station using the identifier, access is preferentially permitted to the UE compared to a UE not using the identifier, wherein the V2X UE operating as the RSU communicates with the base station based on a Uu interface or a PC5 interface, and wherein the V2X UE operating as the relay node communicates with the base station based on a Un interface.

* * * * *